United States Patent
Janiga et al.

(10) Patent No.: US 12,063,212 B1
(45) Date of Patent: Aug. 13, 2024

(54) SECURE TOKEN DRIVEN CONDITIONAL ROUTING OF PROCEEDS

(71) Applicant: Stripe, Inc., South San Francisco, CA (US)

(72) Inventors: Matthew William Janiga, South San Francisco, CA (US); Karen Elizabeth Brinkley, San Francisco, CA (US); Vincent Michael Cogan, San Francisco, CA (US); Brian David Krausz, San Francisco, CA (US)

(73) Assignee: Stripe, Inc., South San Francisco, CA (US)

( * ) Notice: Subject to any disclaimer, the term of this patent is extended or adjusted under 35 U.S.C. 154(b) by 0 days.

(21) Appl. No.: 18/533,978

(22) Filed: Dec. 8, 2023

Related U.S. Application Data

(63) Continuation of application No. 15/357,754, filed on Nov. 21, 2016.

(51) Int. Cl.
*H04L 9/40* (2022.01)
*G06Q 20/00* (2012.01)
(Continued)

(52) U.S. Cl.
CPC ........... *H04L 63/083* (2013.01); *G06Q 20/00* (2013.01); *G06Q 20/02* (2013.01);
(Continued)

(58) Field of Classification Search
CPC ... H04L 63/08; H04L 63/083; H04L 63/0807; H04L 9/3271; G06Q 20/00; G06Q 20/02; G06Q 20/4014; G06Q 20/4097
See application file for complete search history.

(56) References Cited

U.S. PATENT DOCUMENTS

| 9,613,343 | B2* | 4/2017 | Doyle | G06Q 40/00 |
| 2005/0289082 | A1* | 12/2005 | Morris | H04L 9/3271 |
| | | | | 705/65 |

(Continued)

FOREIGN PATENT DOCUMENTS

| WO | 2008/028254 A1 | 3/2008 |
| WO | 2014/140688 A1 | 9/2014 |

OTHER PUBLICATIONS

"Technical Interoperability for MSCTs Based on Payer-Presented Data"—EPC096-201, Dec. 8, 2020 https://www.europeanpaymentscouncil.eu/sites/default/files/kb/file/2020-12/EPC096-20v1.0%20Technical%20interoperability%20of%20MSCTs%20based%20on%20payer-presented%20data%20%28003%29.pdf (Year: 2020).*

(Continued)

*Primary Examiner* — Randy A Scott

(74) *Attorney, Agent, or Firm* — Womble Bond Dickinson (US) LLP

(57) ABSTRACT

Methods and systems for secure token driven conditional routing of proceeds are described. A request to initiate routing of data between remote systems is received by a server computer system, where the request includes an incomplete set of parameters. A validation challenge and a challenge response defined by a first remote computing system are received, and a token that references the first (Continued)

remote computing system and the incomplete parameter set is generated. A validation may then be performed for a second remote computing system using the validation challenge and the challenge response defined by the first remote computing system. The incomplete set of parameters may then be completed by the second remote computing system when the challenge is validated to enable the routing of data according to the complete set of parameters referenced by the token.

19 Claims, 16 Drawing Sheets

(51) Int. Cl.
    *G06Q 20/02*     (2012.01)
    *G06Q 20/40*     (2012.01)
    *H04L 9/32*     (2006.01)

(52) U.S. Cl.
    CPC ..... *G06Q 20/4014* (2013.01); *G06Q 20/4097* (2013.01); *H04L 9/3271* (2013.01); *H04L 63/08* (2013.01); *H04L 63/0807* (2013.01)

(56) References Cited

U.S. PATENT DOCUMENTS

| | | |
|---|---|---|
| 2010/0293381 A1 | 11/2010 | Hammad |
| 2011/0320343 A1 | 12/2011 | Koh et al. |
| 2012/0151570 A1 | 6/2012 | Cooppan et al. |
| 2012/0185387 A1 | 7/2012 | Doyle |
| 2012/0198535 A1 | 8/2012 | Oberheide et al. |
| 2013/0117185 A1 | 5/2013 | Collison et al. |
| 2013/0339238 A1 | 12/2013 | Unland et al. |
| 2014/0351908 A1 | 11/2014 | Koeller |
| 2015/0095205 A1 | 4/2015 | Hebner et al. |
| 2016/0180325 A1 | 6/2016 | Davis et al. |
| 2016/0292680 A1 | 10/2016 | Wilson et al. |
| 2019/0122209 A1* | 4/2019 | Shah .................... G06Q 20/405 |
| 2020/0382327 A1* | 12/2020 | Mokhasi ............ G06Q 20/4097 |

OTHER PUBLICATIONS

"Customer Authentication in Payments"—World Bank Group, Sep. 2021 https://fastpayments.worldbank.org/sites/default/files/2021-10/Customer_Authentication_Final.pdf (Year: 2021).*

* cited by examiner

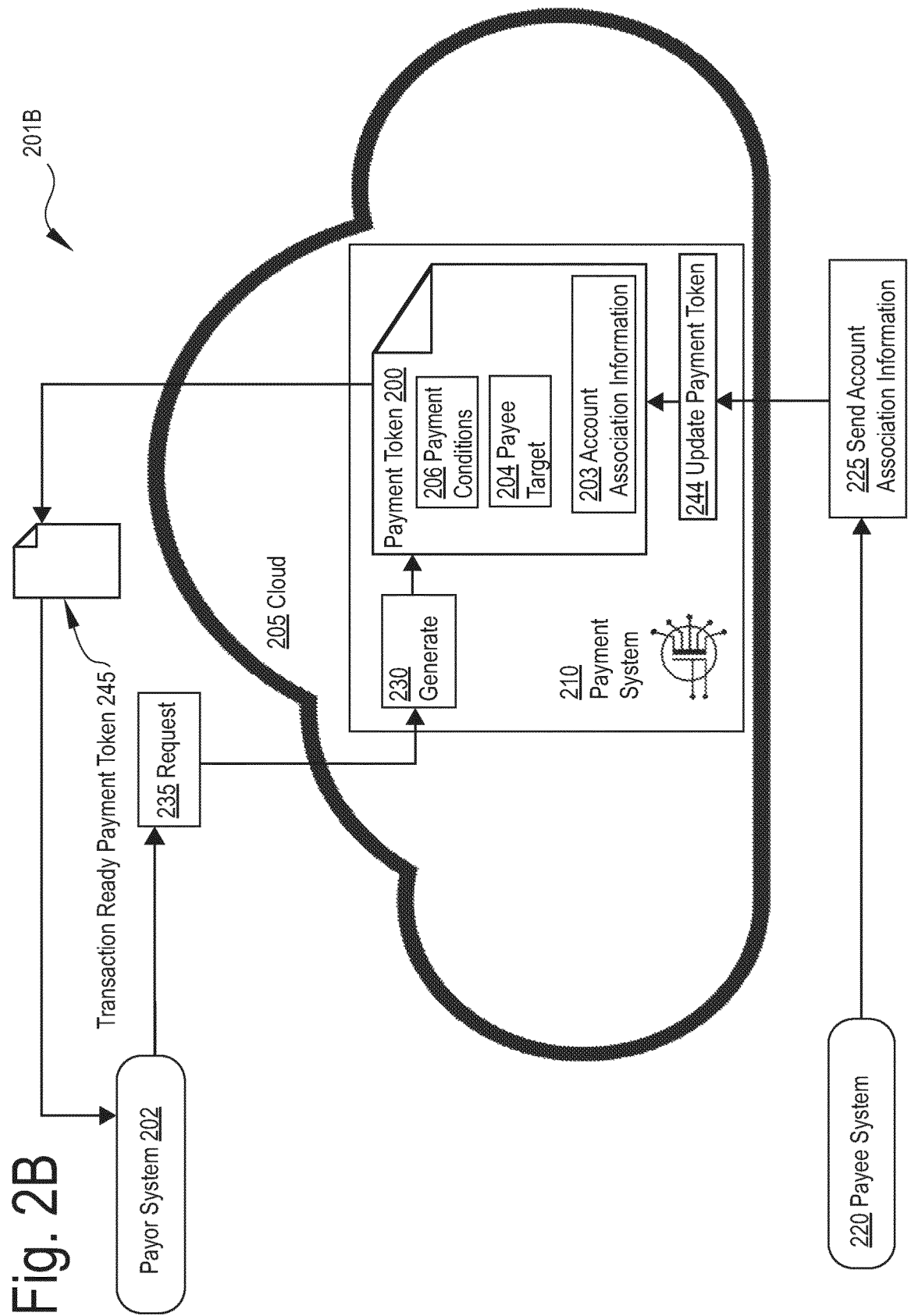

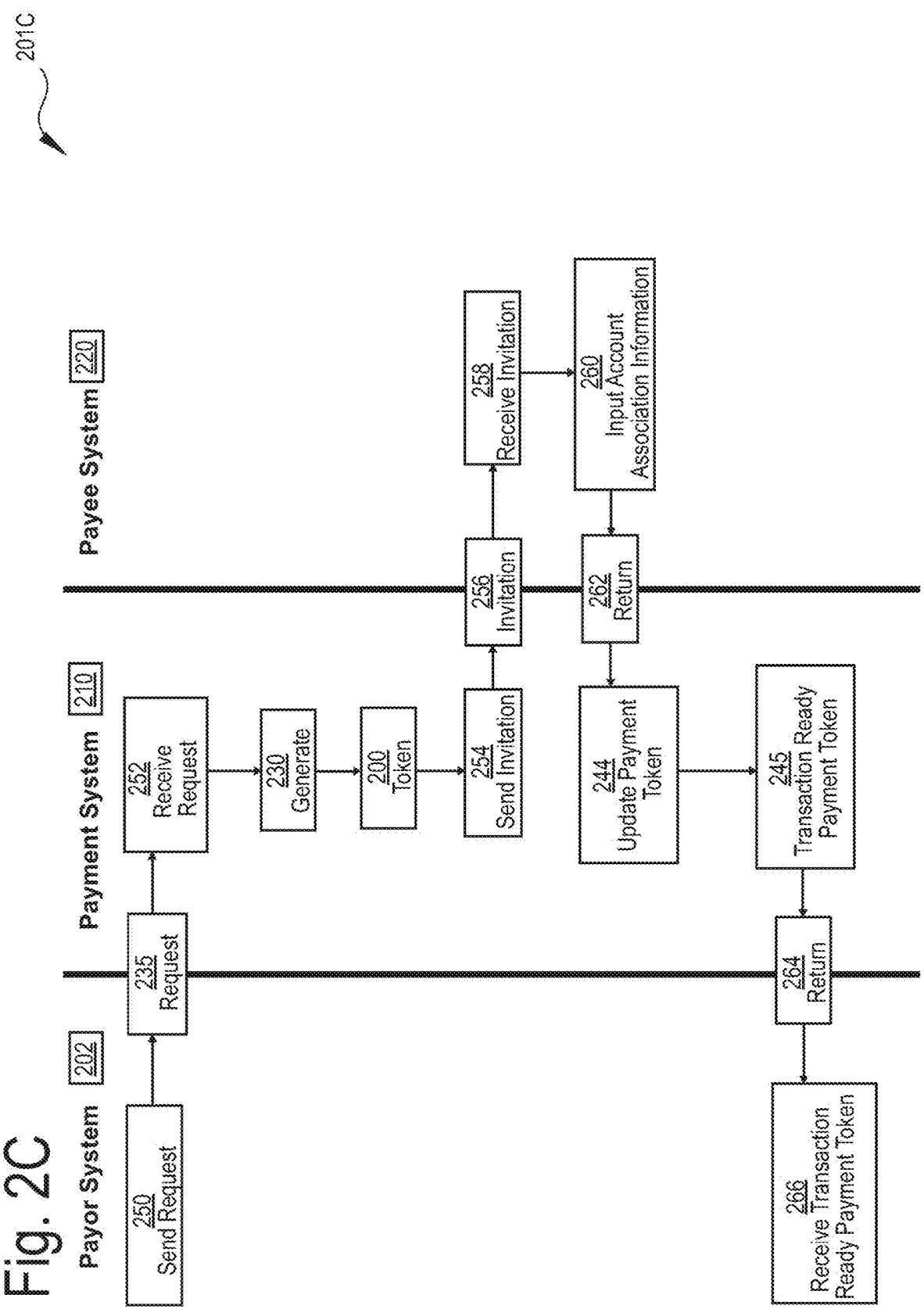

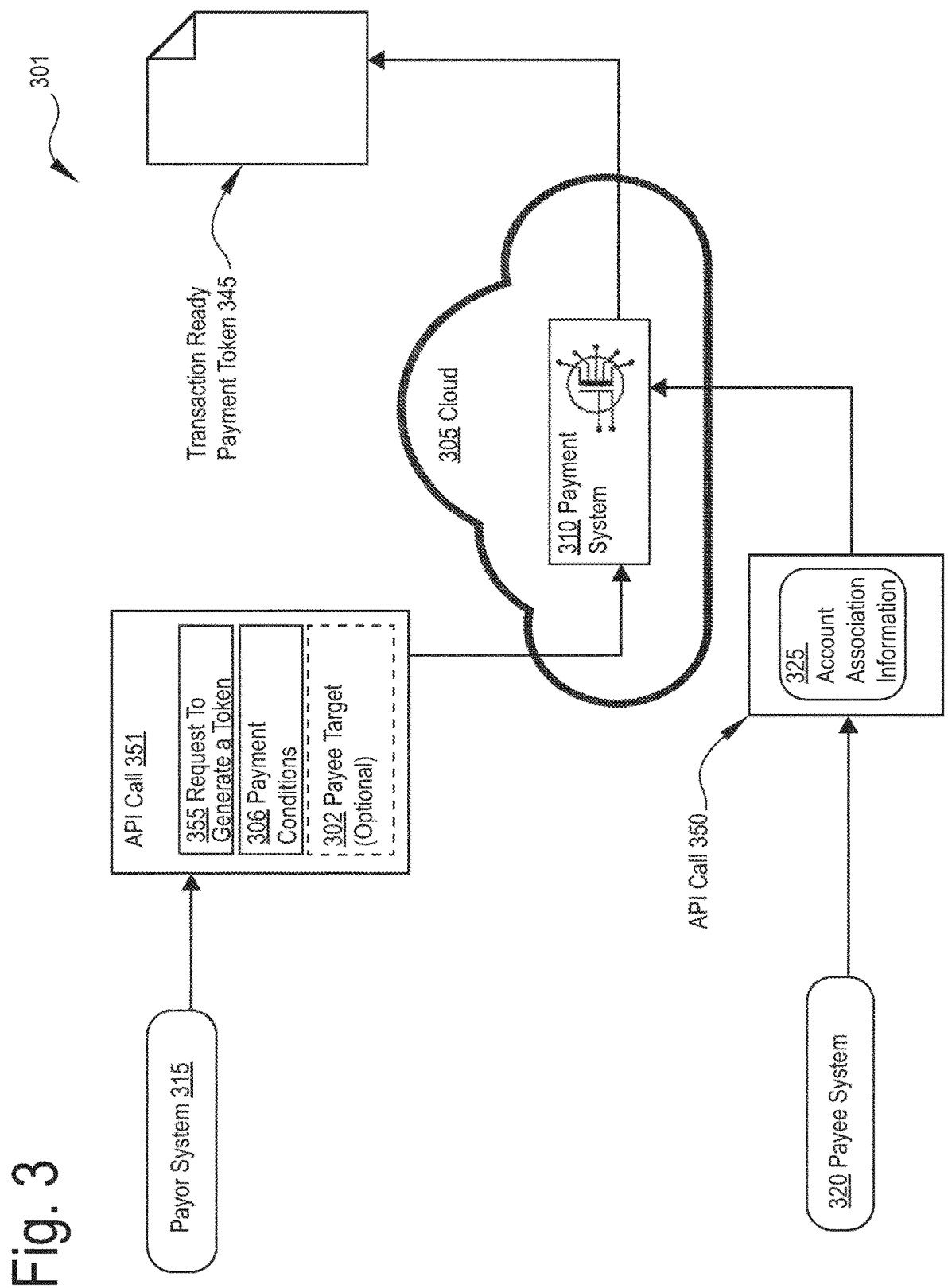

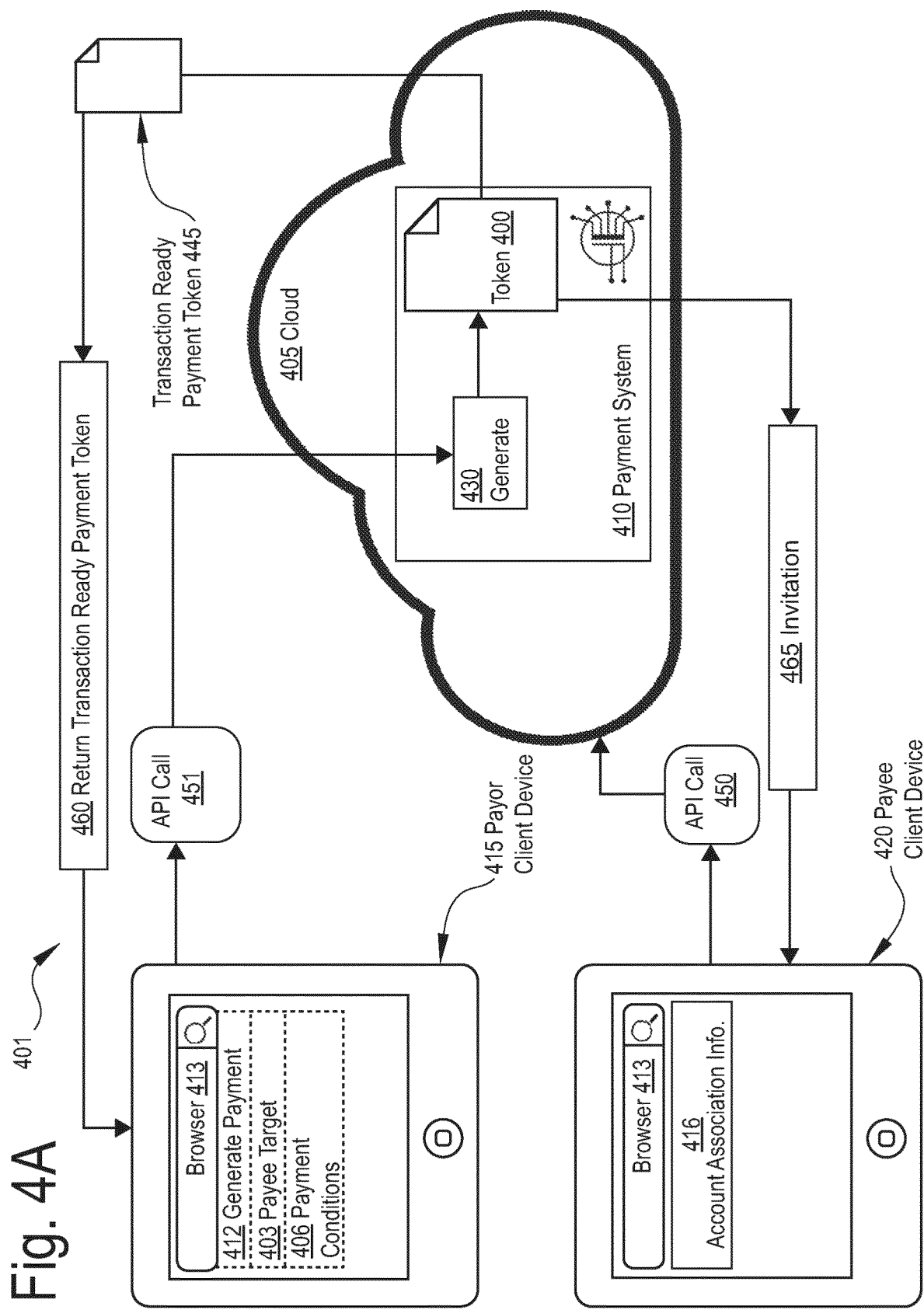

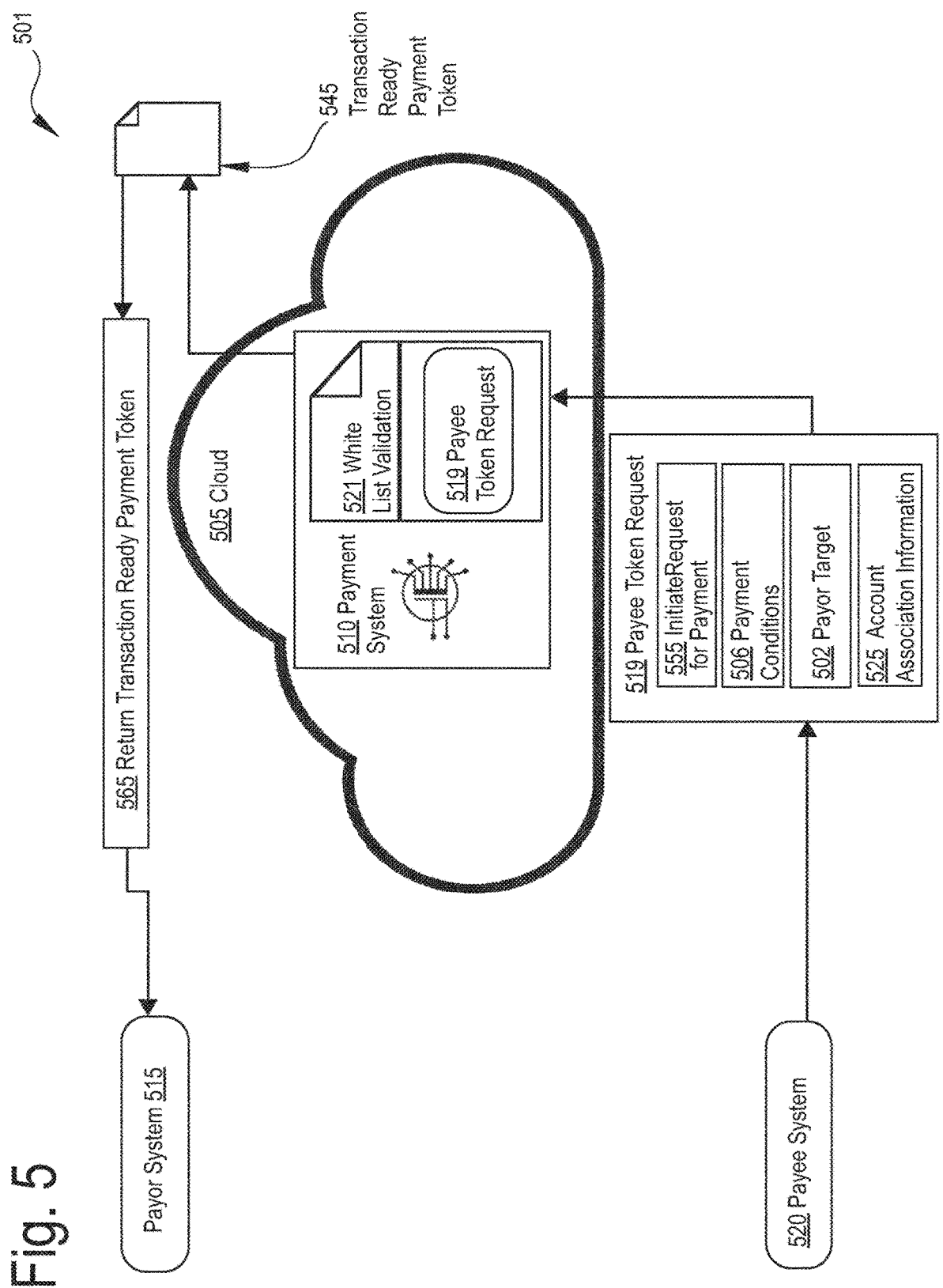

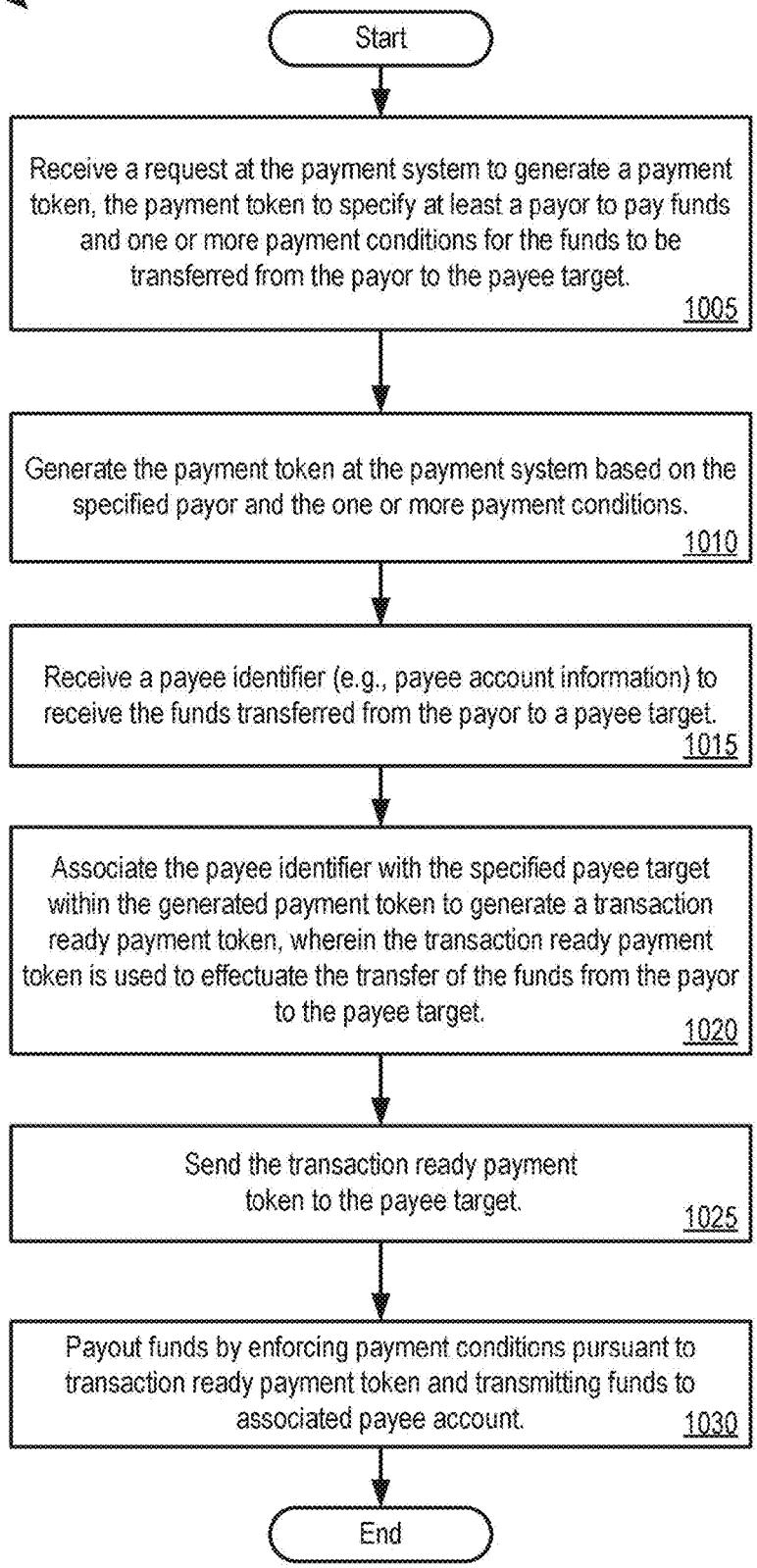

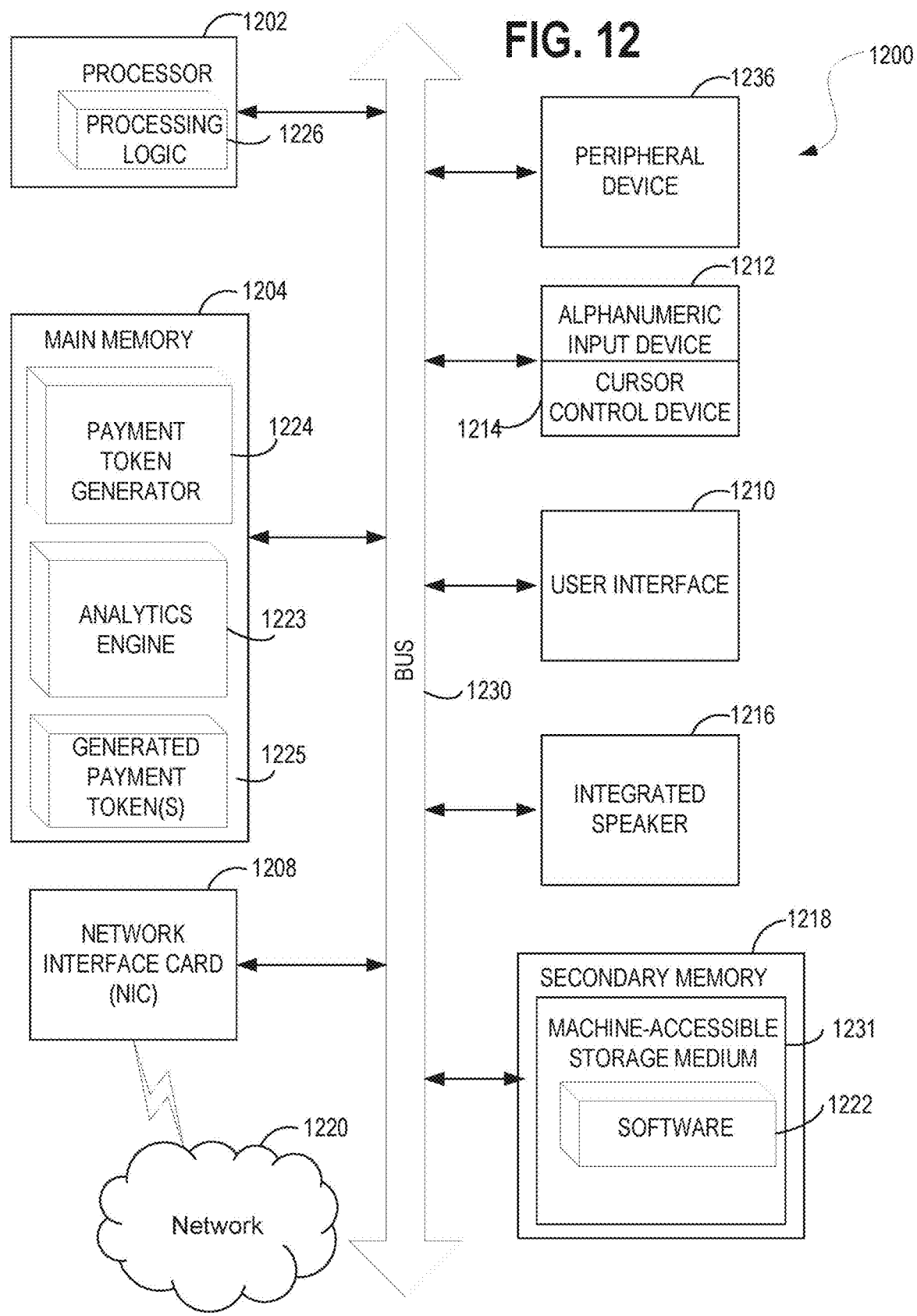

SECURE TOKEN DRIVEN CONDITIONAL ROUTING OF PROCEEDS

CROSS REFERENCE TO RELATED APPLICATIONS

This application is a continuation of co-pending U.S. application Ser. No. 15/357,754 filed Nov. 21, 2016, which is hereby incorporated by reference in its entirety.

TECHNICAL FIELD

Embodiments relate generally to the field of computing, and more particularly, to systems, methods, and apparatuses for routing proceeds using secure tokens. Such means may be implemented within the computing architecture of a hosted computing environment, sometimes referred to as an "on-demand" or a "cloud computing environment," through which clients, subscribers, users, and other parties may utilize the computing infrastructure of the payment system remotely, such as over a public Internet.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to described embodiments.

In many instances, a party, such as a cloud service provider, may lack the resources required to facilitate secure transactions, particularly when implemented at a large (e.g., enterprise-level) scale. As a solution, the party may choose to rely on third parties for handling such transactions, but this approach forces the party to relinquish direct control over the transaction and any corresponding data.

By way of example, merchants looking to accept payments online or in applications (e.g., mobile apps) often must tradeoff between having full control over their customers' experience and the amount of investment into computing infrastructure and customized software necessary to accept such payments. Some merchants minimize their investment by working with third parties to handle their payment needs. In these cases, the merchants typically redirect their customers to the third party, which is responsible for capturing the payment information and processing the transaction. The third party subsequently pays the merchants for successful transactions according to agreed terms.

While such an approach is often simple to implement, the merchant often lacks control over the user experience, resulting in a poor user experience. Customers are redirected from the merchant site to the third party site where they are often required to login or create a new account, causing confusion and customer abandonment. This sequence also makes it difficult to handle changes to customer orders or to up-sell customers on new products subsequent to their primary purchase.

Conventionally, merchants seeking to have more control over payment flow features as well as their customers' user experience must invest significant time and money to build their own payment infrastructure.

Moreover, conventional payment systems fail to provide the flexibility required by modern merchants, including the ability to create payment tokens with limited or incomplete information which may be updated subsequently, or the ability to split or redirect proceeds associated with an existing or previously created payment token.

The present state of the art may therefore benefit from the systems, methods, and apparatuses for implementing secure token driven conditional routing of proceeds as is described herein. Embodiments which provide solutions to these and other deficiencies in present state of the art are described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 2B depicts another alternative exemplary architecture in accordance with described embodiments;

FIG. 2C depicts another alternative exemplary architecture in accordance with described embodiments;

FIG. 3 depicts another exemplary architecture in accordance with disclosed embodiments;

FIG. 4A depicts another exemplary architecture in accordance with disclosed embodiments;

FIG. 5 depicts another exemplary architecture in accordance with disclosed embodiments;

FIG. 10B depicts another flow diagram illustrating an alternative method for implementing splitting for a token and effectuating distribution in accordance with disclosed embodiments;

FIG. 12 illustrates a diagrammatic representation of a machine in the exemplary form of a computer system, in accordance with one embodiment.

DETAILED DESCRIPTION

Figure 1:
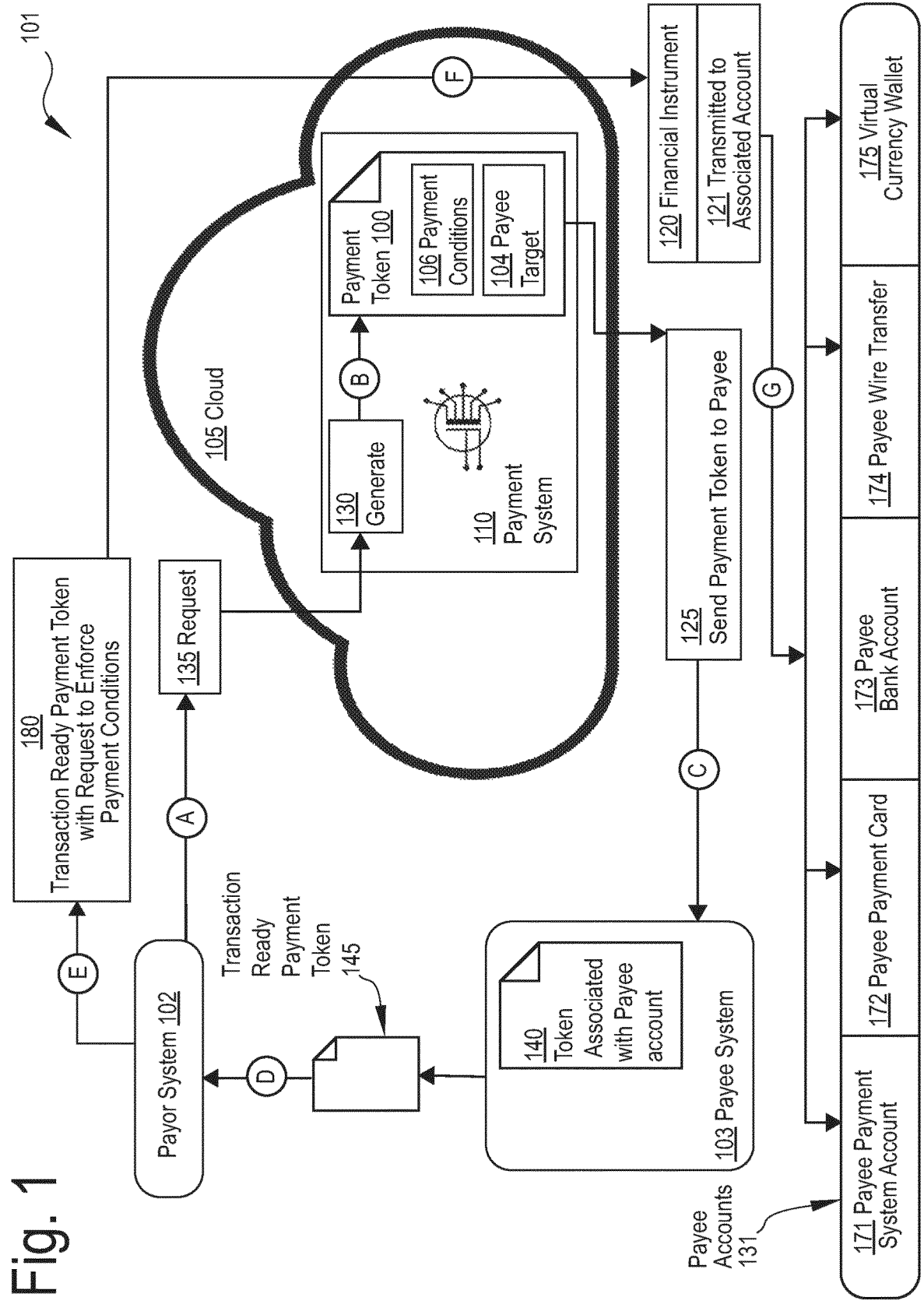
FIG. 1 depicts an exemplary architecture in accordance with described embodiments.

Described herein are systems, methods, and apparatuses for secure token driven conditional routing of proceeds. An example method, performed by a server computer system for processing a routing of data between a first remote computing system and a second remote computing system, includes: receiving, by an interface of the server computer system from the first remote computing system, a request to initiate the routing of data between the first remote computing system and the second remote computing system, the request comprising an incomplete set of parameters; receiving, by the interface of the server computer system, a validation challenge and a challenge response defined by the first remote computing system; generating, by a processing system of the server computer system, a token for the routing of data, the token referencing at least the first remote computing system and the incomplete set of parameters; performing, by the server computer system, a validation of the second remote computing system based on the validation challenge and the challenge response defined by the first remote computing system; in response to a successful validation of the second remote computing system, receiving, by the interface of the server computer system, a second set of parameters from the second remote computing system, wherein the incomplete set of parameters and the second set of parameters form a complete set of parameters referenced by the token; and processing, by the server computer system, the routing of data between the first remote computing system and the second remote computing system using the complete set of parameters referenced by the token.

The following definitions are provided to facilitate a better understanding of the described embodiments:

A Card Network (or Card Association)—refers to financial payment networks such as Visa®, MasterCard®, American Express®, Diners Club®, JCB® and China UnionPay®.

A "Processor" of payment card transactions, as opposed to a "processor" or a "Central Processing Unit (CPU)" of a computing device, refers to a company (often a third party) appointed to handle payment card transactions. Such Processors have connections to various payment card networks and supply authorization and settlement services to merchants or payment service providers. Processors may also move money from an issuing bank to a merchant or an acquiring bank. Such payment cards encompass debit cards, gift cards, credit cards, charge cards, and so forth.

Acquiring Bank (or acquirer) refers to a bank or financial institution that accepts payment card payments from affiliated card networks for products or services on behalf of a merchant or payment service provider.

A Card Issuing Bank (or issuer) refers to a bank that offers card network or association branded payment cards directly to consumers. An issuer assumes primary liability for the consumer's capacity to pay off debts they incur with their card.

Payment Information refers to a wide variety of information which may be associated with payment of funds from a payor to a payee including, for example, primary account number (PAN) or payment card number, card validation code, expiration month and year, Automated Clearinghouse (ACH) transaction data, bank routing number(s), account number(s) for a bank specified by a routing number, etc. The payment information may sensitive, non-public information or may include publicly available information, or more commonly, both.

A merchant refers to an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

A Merchant Site refers to an e-commerce site (e.g., a website) of the merchant where such products and services are licensed or sold.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Various computing systems may be specifically adapted and configured for use with the teachings described herein, or specialized computing apparatuses may be constructed to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 depicts an exemplary architecture 101 in accordance with described embodiments. As shown, the exemplary architecture 101 depicts a system for generating and/or managing secure tokens in connection with transactions. In some embodiments, the exemplary architecture 101 depicts a payment system 110 in the center operating within the cloud 105 and having therein payment token generation means. Further depicted are the payor system 102, the payee system 103, and various payee accounts 131.

Overall, such an architecture provides for the ability of a payment token to be created pursuant to a request, the payment token to be updated with pertinent account information, and ultimately the conditions of the payment token being enforced thus causing a payout of funds pursuant to payment conditions to payee accounts as is shown here.

For instance, starting at operation "A" the payor system 102 instantiates a request 135 to the payment system 110 within cloud 105. At operation "B" the payment token 100 is generated 130 by the payment system 110, in which the payment token 100 is depicted as having payment conditions 106 and a payee target 104. At operation "C" the payment system 110 sends the payment token 100 to the payee system 103 as depicted by block 125.

The payee system 103 next associates the payment token with a payee account as depicted by block 140, creating a transaction ready payment token 145. At operation "D" a transaction ready payment token 145 is returned to the payor system 102.

With the transaction ready payment token 145, the payor system 102 is depicted at operation "E" as sending the transaction ready payment token 145 with a request to enforce the payment conditions (element 180) to the payment system 110 within the cloud 105. At operation "F" it can be seen that the payment system 110 proceeds to effectuate a payout operation of the funds to the associated payee account 131 by transmitting a financial instrument 120 to an associated account 121, depicted at operation "G" as transmitting such funds to a payee account 131 selected from among the payee payment system account 171, or the payee payment card 172 or the payee bank account 173, or the payee wire transfer 174, or the virtual currency wallet 175 for the payee.

Figure 2A:
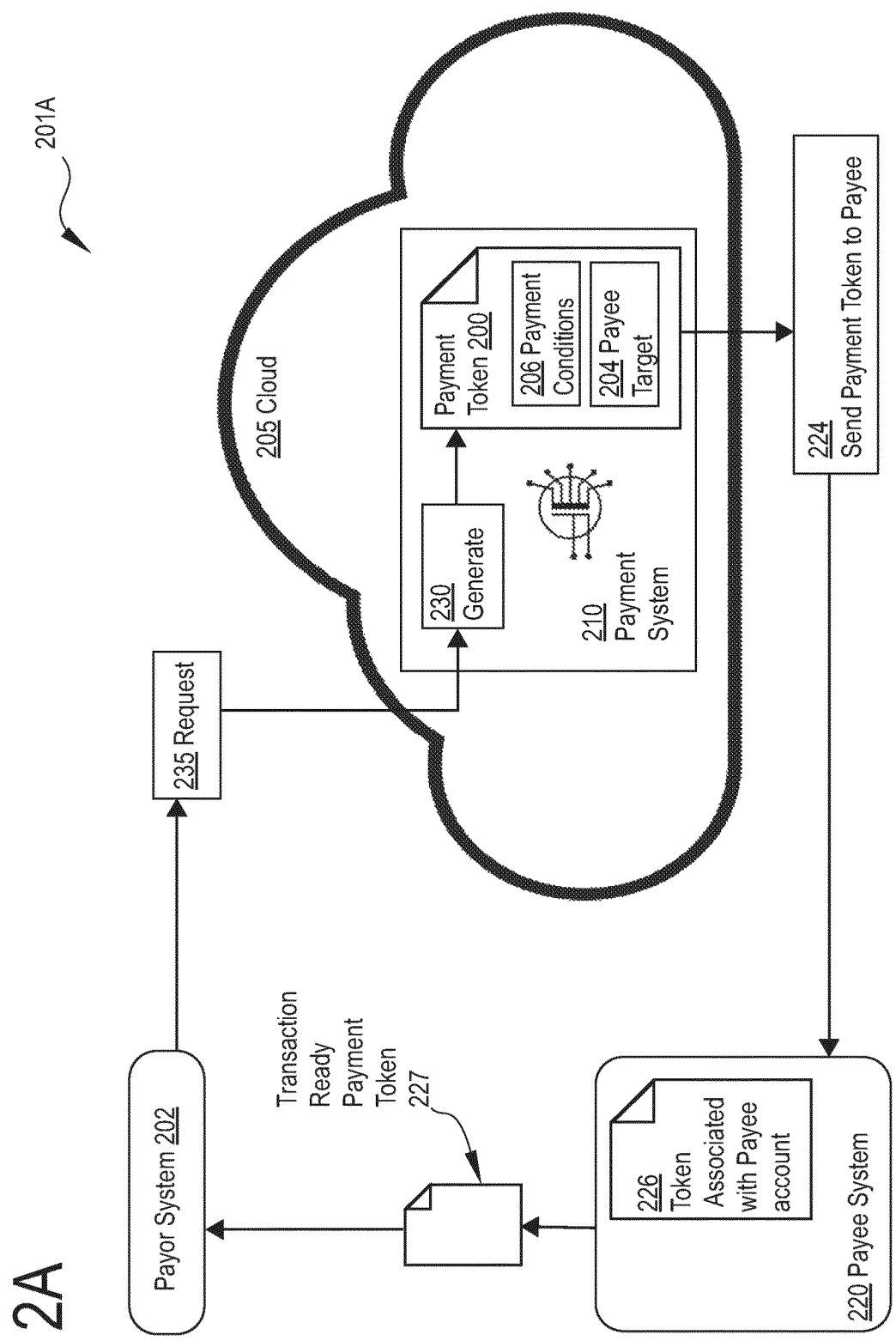
FIG. 2A depicts an alternative exemplary architecture in accordance with described embodiments.

FIG. 2A depicts an exemplary architecture 201A in accordance with described embodiments. Generally, in operation, architecture 201A serves to generate and/or manage secure tokens in connection with transactions. For example, in some embodiments, architecture 201A includes a payment system 210 operating within the cloud 205. Payment system 210 may represent a hosted computing environment which is communicably interfaced with a plurality of user client devices, merchant client devices, payor or payee client devices (e.g., such as mobile devices, smart phones, tablets, PCs, etc.), and so forth. Such devices may communicate with the payment system 210 through the cloud 205, for instance, by communicably interfacing with network interface elements of the payment system 210 through a public Internet or through other networking architecture.

As shown here, payor system 202 communicates a request 235 into the payment system 210 via the cloud 205, responsive to which the payment system 210 is to generate 230 a payment token 200 having payment conditions 206 and a payee target 204, as depicted therein.

According to the depicted embodiment, the payment system 210 is to send the payment token 200 to the payee system 220 as indicated by element 224. The payee system 220 receives the payment token 200 and the payment token is then associated with a payee identifier (e.g., payee account information such as payee account details, payee's telephone number, payee's email address, etc.) as indicated by element 226, creating transaction ready payment token 227. The transaction ready payment token 227 is then transmitted to the payor system 202 and used to effectuate the terms of the payment according to the payment conditions 206 of the payment token. For instance, such a transaction ready payment token 227 may represent at least the minimum set of information required to effectuate the transfer of funds from an origin to a destination. According to one embodiment, such minimal information may constitute simply the payor (e.g., an origin or a source of funds), a payee (e.g., a destination or the "target payee" or "payee identifier" by which to locate such a destination for the funds," and finally conditions (e.g., an amount, percent, etc.). Additional information may be included in such a payment token or updated to a previously created payment token, but such additional information is not strictly required to constitute a transaction ready payment token 227 capable of effectuating payment. A payment token that is not a transaction ready payment token would thus be a payment token that lacks one or more of those pieces of information.

Other flows are possible, some of which are illustrated by the alternative embodiments depicted at the figures which follow. Moreover, some of the interactions may be performed within the payment system 210 such as the association of the payee identifier with the payment token so as to form the transaction ready payment token.

Payment systems presently operate on the "good funds" model such that when the merchant receives the invoice from the supplier, any check, wire, or funds transfer initiated by the merchant as the payor to the supplier as the payee must be made against funds that are immediately available within the payor's funding source, whether it is a bank account, payment card, or otherwise. Even with traditional paper checks, the funds transfer presumes that funds are immediately available, and with new processing technologies which digitize the check image for electronic processing via FedWire provided by the Federal Reserve, funds should be available at the time the check is issued to prevent an account overdraw.

Unlike the "good funds" model, the payment conditions of the requested payment token permit the merchant as the payor to effectuate payment in such a way that as the funds become available, they are settled or transmitted from the payor to the payee according to agreed upon conditions, notwithstanding the fact that the funds are not actually available at the time the payment token is requested and generated by the payment system. In such a way, the payor is telling the payee, "I do not have the $500 right now, but I will have it soon because I am selling products via my website, and I will give you a portion of my proceeds," according to whatever conditions the payor and payee agree upon. Once the transaction ready payment token is generated, the payment token may be utilized to effectuate the payment according to the payment conditions established, such that future monies which become available at a time and quantity unknown in the present are automatically transacted between the payor and payee.

If the payor has a large sale and receives funds sufficient to satisfy the entire invoice from the payee in one single lump sum payment, for instance where the invoice is $1000.00 and the payment conditions stipulate 50% of revenue is transferred from the payor's account to the payee's account, then the entire transaction will be finalized with the single payment. However, if it takes several settlement cycles to collect sufficient funds, then instead of waiting for all funds to be available, the payment conditions permit ongoing partial payments from the payor's account to the payee's account until the full invoice is settled pursuant to the agreed upon payment conditions enforced by the transaction ready payment token.

Unlike conventional revenue based lending models where the bank or lender establishes an automatic ACH transfer on a recurring basis, such as every week or every month that accesses the funding source and blindly attempts to withdraw the funds whether they are available or not, the payment conditions associated with the payment token permit the payment system to transfer an actual percentage of revenue from the payor to the payee. Moreover, the payment system permits non-payment processors to conduct revenue based transactions without necessitating use of a third party payment processor to facilitate the transaction. Elimination of the payment processor represents a cost savings to the payor and payee as it is customary for the payment processors to collect a fee or a commission for their services.

Described embodiments provide the ability for merchants to create ad-hoc and one-off directed payments from their merchant dashboards within the payment system 210 GUI. Described embodiments additionally facilitate the ability for merchants or merchant users having accounts with the payment system 210 to split the proceeds associated with incoming funds including those associated with a previously formed transaction ready payment token. Still further, described embodiments permit merchants to establish a variety of payment conditions with the splitting of such proceeds.

Consider for instance a business with two owners. As the business acquires goods wholesale and sells them for retail, there are liabilities created and also incoming gross profits received. Such funds may be deposited into the merchant user account for such a business. However, the individual owners of the business may desire to divide at least a portion of the profits between them, necessitating that the business owners once a month, or with some chosen regularity, write a check to themselves from the merchant user account into each of the owner's respective bank accounts. Moreover, these business owners may have expenses which need to be paid from the merchant user account, such as their monthly lease payment, or ad-hoc expenses such as payments for wholesale goods received or various materials and supplies consumed in the operation of the business.

Using the payment system dashboard, the merchant may create useful payment conditions and may specify one or more payee targets. Consider for example that the merchant business sells T-shirts via an on-line e-commerce website. The business owners may submit a request 235 from their device operating as the payor system 202 in which the request specifies via the payment conditions 206 that part of the proceeds the merchant user account receives from processing payment card transactions is to be directed into each of the business owner's private checking accounts as the payees. For instance, the payment conditions may specify that a percentage of gross profits received is directed automatically to the private checking accounts of the business owners.

Alternatively, there may be a payment due for supplies associated with the business, such as blank T-shirts and T-shirt printing materials owed to a third party. Using the dashboard of the payment system 210, the merchant may invite the third party operating as the payee to link their bank account information with the payment token 200 to associate the third party payee's account information with the payment token as indicated at element 226. For instance, the third party payee to whom the funds are owed for the blank T-shirts and T-shirt printing materials may receive an email, SMS notification, or some alert notifying them that they are the payee target 204 and advising them of the established payment conditions 206, for instance, that they are owed a specified dollar amount to be paid from the merchant user's account pursuant to the payment token generated by the payment system 210.

Such a third party payee target may link their account information from a dashboard or user interface of their payee system 220 causing an update to the payment token 200. For instance, the payment system 210 may accept the provided account information from the payee system 220 and associate the payee identifier with the payment token and then return a transaction ready payment token 227 to the payor system 202 to effectuate payment.

The specified payment conditions 206 are not limited to merely a dollar amount to be paid from the payor to the payee. For instance, the payor may specify via the payment conditions that the payee is to receive $N dollars from the next payment processing proceeds settlement from the payment system to the payor's merchant user account or a percentage of all future payments until a total amount is settled, or $N dollars per proceeds settlement cycle for the next X cycles, etc.

According to a particular embodiment, the payor system 202 requests the payment system 210 generate the payment token 200 and the third party payee is then invited to open the payment token 200 and validate their identity as the payee (e.g., for instance by answering pre-agreed questions embedded within the payment token 200 or invitation) and once validated, the third party payee then either provides their account information (e.g., bank account information) to the payment system 210 to update the payment token or the third party payee populates their account information into a writable or accessible portion of the payment token 200. With the third party payee's account information, the payment token 200 may be updated to generate the transaction ready payment token 227 having the third party payee's account information now associated by the transaction ready payment token 227 with the target payee 204 of the originally generated payment token 200.

According to such an embodiment, the next time the payment system 210 settles payment card proceeds to the merchant user's account acting as the payor, the payment system 210 will automatically settle funds to the third party payee's account based on the payment conditions 206 of the transaction ready payment token 227 which was updated with the payee's account information and the remaining portion will be settled to the payor's account. For instance, if the payment conditions specify 15% of the incoming settlement to be settled to the payee then such funds will be calculated and settled to the payee pursuant to the transaction ready payment token 227, and the remainder will settle to the payor's account.

Other embodiments are described in greater detail below. For instance, funds may be settled to the payee target via a linked debit card specified by the third party payee with the payment system 210 paying over the debit rails, which thus may permit the payee to receive funds the same business day the funds are settled by the payment system. Alternatively, the third party payee may be another merchant user with a payment system 210 account and when invited to link their account information, the third party payee may simply link to their payment system account (e.g., the payee may be a Stripe user and therefore link to their Stripe account), thus causing the transaction ready payment token 227 to associate the specified payee target 204 with the third party payee's merchant user account within the payment system 210. For example, the transaction ready payment token 227 may link to the third party payee's Stripe account as the destination for the funds transferred from the payor to the payee.

Advantageously, both the payor and the payee may utilize their existing dashboard features and GUI via which they ordinarily access the payment system. If the payee is not an existing registered user of the payment system 210 then responsive to the invitation to provide their account information they may be presented with a simplified GUI within which to populate their account information to receive funds without necessitating they register with the payment system.

In other embodiments, the payee may elect to pass the transaction ready payment token 227 to yet another specified payee to whom the payee owes money, thus permitting funds to pass from the original payor to the newly specified payee, effectively redirecting the funds from the specified payee to a new payee. Yet further variations permit the originally specified payee to split the funds to be received associated with the transaction ready payment token 227 keeping a portion and redirecting another portion. Other enumerated embodiments are described below.

FIG. 2B depicts an alternative exemplary architecture 201B in accordance with described embodiments. Generally, in operation, architecture 201B serves to generate and/or manage secure tokens in connection with transactions. For example, in some embodiments, architecture 201B includes payment system 210 operating within the cloud 205. As depicted here, payor system 202 submits request 235 which is transmitted via the cloud 205 to the payment system 210 which responsively is to generate 230 the payment token 200.

Further depicted is the payee system 220 sending account association information 225 to the payment system 210, for instance, responsive to an invitation from the payment system 210 or the payor system 202. The payment system receives the account association information 203 and updates 244 the payment token 200 by associating the payee target's 204 account information 203 with the payee target 204. Once updated, a transaction ready payment token 245 is formed and returned to the payor system 202 that had originally requested the payment token.

With transaction ready payment token 245 it is possible to redirect funds originally destined for a given payee target 204 to a third party, such as a different merchant or a supplier, etc. For instance, using the T-shirt example from above, the merchant selling the T-shirts for retail may incur various costs and expenses during the ordinary course of business. Such a T-shirt merchant would conventionally be invoiced or billed for various supplies and then write a check to settle those invoices or bills, for instance, by mailing a check to a wholesaler. Alternatively, the T-shirt merchant may establish an electronic funds transfer or another type of online payment to the wholesaler to settle the invoices and bills.

Regardless of the mechanism by which the T-shirt merchant settles those bills, all prior solutions require that the merchant actually have funds available, either in deposit within their account or credit available to them via their account. There is no prior known mechanism by which the merchant may settle or pay their bills and invoices without knowing what type of income or revenue will be available and when such funds will be available to their account. It is therefore necessary for the merchant to wait until credit or funds are actually available or at least known with a degree of certainty when such funds will be available before the settlement transaction can be established to settle the bills and invoices. Consequently, the conventional methods require three separate transactions to occur. First, the purchase of the wholesale T-shirts by the merchant from the wholesaler; second, the transaction by the wholesaler invoicing or billing the merchant for the wholesale T-shirts; and third, the transaction to effectuate payment for the wholesale T-shirts from the merchant to the wholesaler.

According to described embodiments, the merchant may establish payment conditions 206 to effectuate payment from the merchant to the wholesaler without necessarily knowing when funds will be available. Although counter-intuitive in comparison to conventional transactions, the merchant selling T-shirts will presumably sell some quantity of the purchased wholesale T-shirts over the coming weeks and the merchant may desire to settle the invoice or bill for the wholesale T-shirts using those incoming funds from the retail sale of the T-shirts by the merchant. Therefore, rather than establishing multiple transactions to settle a portion of the invoice over several weeks or waiting the several weeks until all funds are known to be available to the merchant, the merchant may establish payment conditions specifying that the merchant as the payor system 202 is to transfer from the payor to the payee target 204 (e.g., the wholesaler or payee system) a percentage of incoming settlement funds arriving at the payor's account until the entire invoice is settled. For example, the payment conditions may specify to pay 50% of arriving settlement funds from the payor to the payee until a full amount of the invoice is settled. Say for example the purchase of T-shirts is for $500 from the wholesaler, the payment conditions may specify to pay 50% of incoming revenue arriving to the merchant until the full $500 is settled or the payment conditions may specify to pay all available funds in excess of a $1000.00 buffer within the merchant's account until the full $500 invoice is settled. In fact, a wide array of payment conditions are permissible which permit the merchant as the payor to establish the settlement transaction to pay the wholesaler as the payee without actually having to know when funds are available or how much is available. The funds themselves may reside within the merchant's user account at the payment system 210 and be transferred to the wholesaler's merchant user account within the same payment system 210 or may reside within the merchant's bank account and be transferred to the wholesaler's bank account based on the account association information received by the payment system 210 or some other combination.

According to certain embodiments, security protections are instituted to protect the account numbers of the merchant and wholesaler, such that neither entity has visibility to the private and protected information of the other. For instance, if a credit or debit card is linked by the wholesaler or merchant (e.g., the payee or payor respectively) as the funding source or destination, then the payment system 210 may tokenize the associated account numbers which are considered private and protected. Similarly, if a bank account is linked by an entity as the funding source, then the account number or even account number and account name may be tokenized.

For instance, the payment system 210 may tokenize the account numbers for payment cards or account numbers for bank accounts such that the account information can be passed between the parties via the payment token without the entities being able to read or view such information. In certain embodiments, the tokenization results in an electronic payment token which may be passed between the entities but only deciphered by the payment system 210. In alternative embodiments, tokenization results in an electronic payment token being created and stored at the payment system 210 and a link back to the payment token is then shared with the interested parties. In such an embodiment, the link itself does not possess the account information and following the link by one party or another provides a complete reference to the payment token but does not grant access or visibility to the payment token by any entity other than the payment system.

Generally speaking, the payment token may be considered as a pointer contained within the payment system, in which the exemplary code 'Alkjz57a23av1987121k' corresponds to a collection of information such that when the payment system receives that same code Alkjz57a23av1987121k' back from a payor or payee or other party, the payment system understands what to do with the code because it points, links, or corresponds to the collection of information stored within database systems or servers within the payment system, in which this collection of information represents the contents of the "token" or "payment token." Alternatively, it is equally permissible for the payment token to be an object or file, such as an electronic payment token capable of being sent or passed between the entities, similar to an encrypted zip file, such that the contents of the payment token may be updated and passed with the object or file, but restricted in such a way that the payment system controls the ability to access and decipher the information stored within the object or file.

In such a way, when a party comes to purchase from the merchant or when the merchant (the payor) requests 235 a payment token 200 with which to pay the wholesaler (the payee), the payment system receives the payment card or account information as a trusted intermediary without exposing such information to any other party. Rather, the payment card or account information is tokenized and the payment token 200 or a link to the payment token is then shared as necessary. Because the payment system 210 acts as an intermediary, the payor system 202 is never required to receive or handle or be exposed to the payee's account information and the payee system 220 does not receive and has no visibility to the payor system's 202 account information. Further, because the payor and payee are not exposed to the sensitive and private payment data there simply is no need for either to institute costly and complex security protocols or comply with the rigorous financial regulations associated with such data.

FIG. 2C depicts another alternative exemplary architecture 201C in accordance with described embodiments. Generally, one or more systems of architecture 201C (e.g., system 202, system 210, system 220) serve to generate and/or manage secure tokens in connection with transactions. For example, in some embodiments, architecture 201C includes the payor system 202, the payment system 210, and the payee system 220. In particular, there is depicted a swim lane diagram having the payor system 202 on the left, the payment system 210 in the middle, and the payee system 220 on the right. The process flow begins with send request 250 at payor system 202 which transmits request 235 to the payment system 210. Payment system receives the request 252 and responsively is to generate 230 the payment token 200. According to such an embodiment, the payment token has been created yet still requires account association information before it may be considered as a transaction ready payment token. Therefore, the send invitation 254 operation causes the payment system 210 to transmit invitation 256 to payee system 220. Payee system 220 then receives the invitation 258 and inputs account association information 260. The account association information is returned 262 to the payment system 210 and the payment system updates the payment token 244 with the provided account association information resulting in the generation of the transaction ready payment token 245. The transaction ready payment token 245 is then returned 264 to the payor system 202 which receives the transaction ready payment token 266 which may then be utilized to effectuate payment from the payor to the payee. Alternative variations include the payee system 220 requesting payment or the transaction ready payment token being returned to the payee rather than the payor or being returned to both the payee and the payor systems.

In accordance with a particular embodiment, the payor generates the request for the payment token and the payee submits account association information 260 responsive to an invitation 256 which is then updated 244 to the payment token prior to generating the transaction ready payment token 245, however, the payee may additionally or alternatively invalidate the requested payment token. For instance, the payee may simply reject the payment token rather than providing account association information if, for instance, the payment conditions do not meet with the approval of the payee or if the payor is not a recognized entity with whom the payee has a business relationship. Alternatively, the payee may submit a requested change to the payment conditions in addition to submitting the payee's account association information. In such a way, the payment system will reverse the flow by treating the payee as the new requestor of the payment token, causing an invitation to be sent to the payor to validate the modified payment token. Take for example a payor that submits a request for a payment token to send $500 to the payee, however, the payee recognizes that the actual amount owed is $200. The payee may submit a modification to the payment conditions to change the $500 to $200, in which case the payment token is then reverted to the payor to validate the updated amount.

FIG. 3 depicts another exemplary architecture 301 in accordance with disclosed embodiments. Generally, in operation, architecture 301 serves to generate and/or manage secure tokens in connection with transactions. For example, in some embodiments, architecture 301 includes payment system 310 operating within the cloud 305. As depicted, the payor system 315 interacts with the payment system via an Application Programming Interface (API) call 351, in which the request to generate a payment token 355 is passed via the API call 351 along with payment conditions 306 and optionally included as the payee target 302.

The payment system 310 receives the API call 351 from the payor system 315 and responsively generates a payment token. If the payee target 302 is not passed with the original request 355 to generate the payment token then the requested payment token may be subsequently updated to include a specified payee target 302. Because such a payment token is lacking the account association information 325 it is not yet a transaction ready payment token 345. Accordingly, the payment system 310 additionally receives from the payee system 320 an API call 350 including at least the account association information 325 which is associated with the payee target 302 such that a funding destination for transferred funds from the payor to the payee is known to the payment system. With all the required information provided, the payment system 310 then generates the transaction ready payment token 345 which may be transmitted to the payor system 315 or the payee system 320 or both or a link to the transaction ready payment token 345 may be shared with one or both of the payee and the payor.

FIG. 4A depicts another exemplary architecture 401 in accordance with disclosed embodiments. Generally, in operation, architecture 401 serves to generate and/or manage secure tokens in connection with transactions. For example, in some embodiments, architecture 401 includes payment system 410 operating within the cloud 405. As depicted, the payor client device 415 interacts with the payment system 410 via a browser 413 via which the payor may initiate a request to generate a payment 412. Within the browser 413, the payor will input the payment conditions 406 and optionally input the payee target 403.

According to such an embodiment, the browser 413 initiates an API call 451 to the payment system based on the request to generate a payment 412 initiated at the browser 413 and the payment system 410 responsively generates 430 the payment token 400. If the payee target 403 is not specified at the time of the original API call 451 then it may be provided later the payment token 400 will be updated with the payee target 403 information.

According to such an embodiment, the payment system 410 sends an invitation 465 to the payee client device 420 based on the payee target 403 information. A browser 413 at the payee client device may be utilized to enter the account association information 416 for the payee target thus associating the payee target with a funds destination. The account association information 416 is then returned to the payment system via an API call 450 generated by the browser at the payee client device 420.

The browsers 413 of the payor and payee client devices may provide a GUI interface to the dashboard feature utilized by each of the payee and payor to interact with the payment system or may provide a GUI to different specialized interfaces provided by the payment system 410.

With the account association information 416 returned to the payment system 410 the transaction ready payment token 445 is generated and as depicted here, the payment system returns the transaction ready payment token 460 to the payor client device 415. However, in other embodiments, a link may be sent or shared with the payor client device or the transaction ready payment token 445 or a link to the transaction ready payment token 445 may be additionally or alternatively provided to the payee client device 420.

Figure 4B:
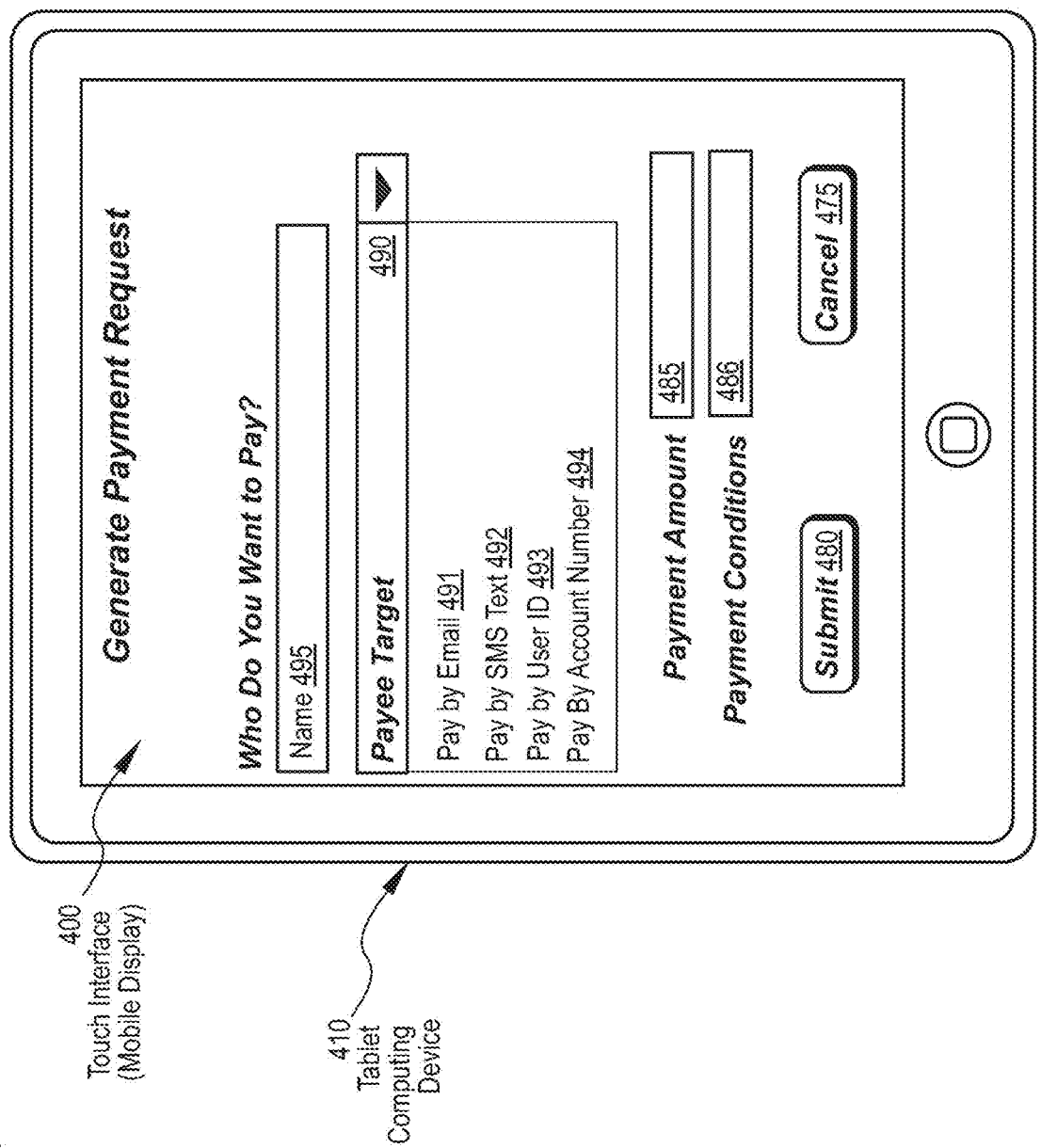
FIG. 4B depicts an exemplary graphical user interface (GUI) by which a user may generate a transaction request or submit a request to generate a token in accordance with disclosed embodiments.

FIG. 4B depicts an exemplary GUI 402 by which a user may generate a transaction request or submit a request to generate a token in accordance with disclosed embodiments. As depicted here, the GUI 402 is displayed via a tablet computing device 410 having a touch interface 400 or a mobile display, however, other such devices are feasible, such as a PC, smart phone, etc.

As depicted here, the GUI 402 to generate a request (e.g., payment request) includes a field to provide the payee's name 495 along with a payee target 490 type, such as to pay by email 491, to pay by SMS text 492, to pay by user ID 493, for instance if the payee target has a user account with the payment system, or to pay by account number 494, such as ACH, debit card, payment card, bank account number, etc. A payment amount 485 field and a payment conditions 486 field is additionally provided, although the actual GUI 402 provides a greater array of conditions by which to control the payment. The user generating the payment request may then either submit 480 or cancel 475 the transaction populated via the GUI 402.

The payment conditions 486 of a payment token are enforced by the payment system but they are decided by the parties external to the payment system according to contractual or commercial agreements between the parties. For instance, in the simplest example, the transaction ready payment token may represent an exemplary value of $500 to be transferred from the payor to the payee in which the payment token links to the payor's bank account via ACH and links to the payee's bank account via ACH. In such an example, the payment system will settle the funds by withdrawing the money from the payee and depositing the same to the payor. However, the parties may agree upon payment conditions that cause an exemplary 2% of revenue settled to the payor to be transferred to the payee until a maximum of $1000.00 is attained or until 3 months expires, whichever comes first. Or the exemplary payment conditions may specify 2% of revenue for 3 months at which point a balloon payment is due in the amount of $1000.00 less the accrued funds received via the 2% of revenue settlements over the preceding 3-month period. The varieties of payment conditions are not limited by the payment system, but rather reflect the parties' commercial agreements and preferences. Other constraints and payment conditions may represent a per-day maximum, a per-day minimum, an amount of available funds in excess of a minimum account value, interest rates, early payment incentives and discounts, and so forth.

According to a particular embodiment, there is a drop down box provided at the GUI 402 providing default payment conditions such as timing, percentage, amount, etc. In accordance with another embodiment, there are payment token default templates which may be selected by the payment system users to generate a payment token in which payment token default template specifies multiple conditions which may be adopted or modified by the payment system user.

In accordance with a particular embodiment, the payment conditions correspond to business or corporate accounting rules and the payee and payor are both subsidiaries of the same corporate entity. In such a way, the payment system facilitates payments and the movement of funds between the various subsidiaries and entities within a single corporate entity. Consider for instance a corporation having an IT support department which provides equipment and services to the various divisions of the corporation. The IT support department does not sell its services or products to external customers, but it nevertheless receives budget or internal revenue from other departments for which it provides support. Such accounts are typical within corporations, however, the burden of facilitating such payments and enforcing the various payment conditions (e.g., corporate accounting rules) may be lessened through the use of the payment system and the means for generating and use of the payment tokens as described herein.

In accordance with another embodiment, the payor and payee establish a challenge question and answer to validate the payment token. For instance, the payor may include within the payment token a challenge question via the GUI 402, such as the number of times the payor and payee have spoken via telephone that week. When the payee then validates the payment token the payment system will prompt using the customizable challenge question which, if answered correctly, permits the payment token to be validated. Similarly, if the payee is requesting the payment token, then the payee may include an agreed upon challenge and response to be prompted and answered by the payor as part of the validation process.

According to another embodiment, the payment token may embed both private and public keys such that when a payment token is passed to a third party, the authenticity of the payment token may be verified via the public key, but the use of the payment token necessitates that the payee or a new payee as designated by the original payee possesses the private or secret key.

FIG. 5 depicts another exemplary architecture 501 in accordance with disclosed embodiments. Generally, in operation, architecture 501 serves to generate and/or manage secure tokens in connection with transactions. For example, in some embodiments, architecture 501 includes payment system $10 operating within the cloud 505. Unlike the prior examples, here the payor system 515 does not initiate the request for the payment token from the payment system 510. Rather, the payee system 520 sends a payee token request 519 to the payment system 510 to initiate the request for payment 555. Included within the payee token request 519 are the payment conditions 506, the payor target 502, and the account association information 525 for the payee specifying the account information or other details necessary to deposit funds to a funds destination.

The request for payment initiated by the payee is transmitted to the payment system 510 within the cloud 505. The payment system 510 receives the payee token request $19 and either sends an invitation to the payor system 515 to review and accept request 519 or alternatively, the payment system 510 may perform white list validation against the payee system 520 to determine if the payee is pre-authorized by the payor system 515 to submit the request for the payment token. If the payee token request passes white list validation then the payment system generates the transaction ready payment token 545 which is then sent as a link or a payment token to either or both the payor system and the payee system as previously described. For instance, subsequent to white list validation 521, the payment system 510 returns the transaction ready payment token 545 to the payor system as depicted by block 565. If white list validation 521 fails then the payment system 510 either sends the invitation to the payor system 515 to review or simply rejects the payee token request 519 depending on the configuration and preferences set for the payor system 515 and the payment system 510.

In accordance with one embodiment, the payment system performs additional analysis on the transactions associated with any payment token request and generates a risk score or fraud score based on the analysis that predicts the likelihood of the transaction being fraudulent. According to such embodiments, the payment system may reject any request for a payment token having a risk or fraud score in excess of a threshold. In alternative embodiments, the payor requesting the payment token may set a payment condition requiring that the transaction have a risk or fraud score below a user configurable threshold which is then enforced by the payment system.

For instance, as part of an onboarding process for new merchant user accounts the risk analysis performed by the payment system may evaluate payment token requests associated with new users at a higher risk level than the same request associated with established users. Other metrics considered may be the volume of requests in which, by way of example, a merchant user requesting 1,000 payment tokens in a very short period of time will result in an excessive risk or fraud score. Alternatively, deviation from a past volume may result in an excessive risk or fraud score. Similarly, valuation of the requested payment tokens may be considered, for instance, where the value of a payment token deviates substantially from an average transaction amount for the user or where the value of a payment token requested represents an unusually large percentage of the available funds for the merchant user's account. Such risk analysis may be performed regardless of whether the payment token is requested by the payor or the payee in accordance with the described embodiments.

Figure 6:
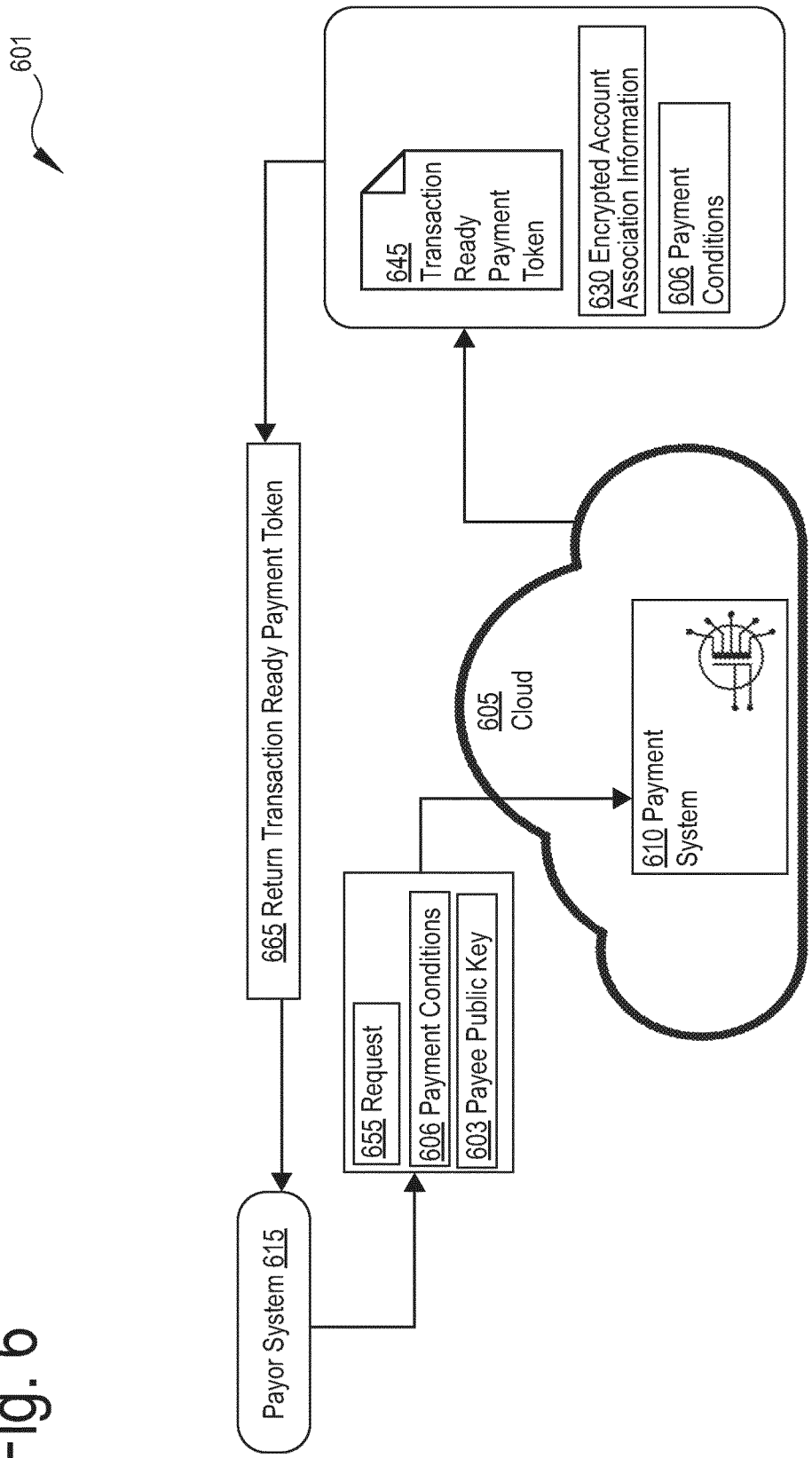
FIG. 6 depicts another exemplary architecture in accordance with disclosed embodiments.

FIG. 6 depicts another exemplary architecture 601 in accordance with disclosed embodiments. Generally, in operation, architecture 601 serves to generate and/or manage secure tokens in connection with transactions. For example, in some embodiments, architecture 601 includes payor system 615. In certain instances, it is possible for the payor system 615 to pay a payee target without knowing the payee target's account details and without requesting account association information from the payee target. For instance, as depicted here, the payor system 615 generates a request 655 for a payment token specifying the payment conditions 606 and additionally specifying a payee public key 603 rather than a payee target with unknown account association information. The payee public key 603 may be linked to account association information which is known to or decipherable by the payment system 610 (within cloud 605) despite being inaccessible to the payor system 615 having generated the request.

According to such an embodiment, the payment system 610 receives the request 655 and using the payee public key 603, the payment system 610 retrieves or deciphers the necessary account association information such that a funding destination may be established for the payee and then a transaction ready payment token 645 is generated having the payment conditions 606 therein and additionally including encrypted account association information 630.

The transaction ready payment token 645 is then returned 665 to the payor system 615 which may then utilize the returned payment token to effectuate payment from the payor to the payee. Alternatively or additionally, the transaction ready payment token 645 may be sent to the payee associated with the payee public key 603 as either a link or an electronic payment token.

Figure 7:
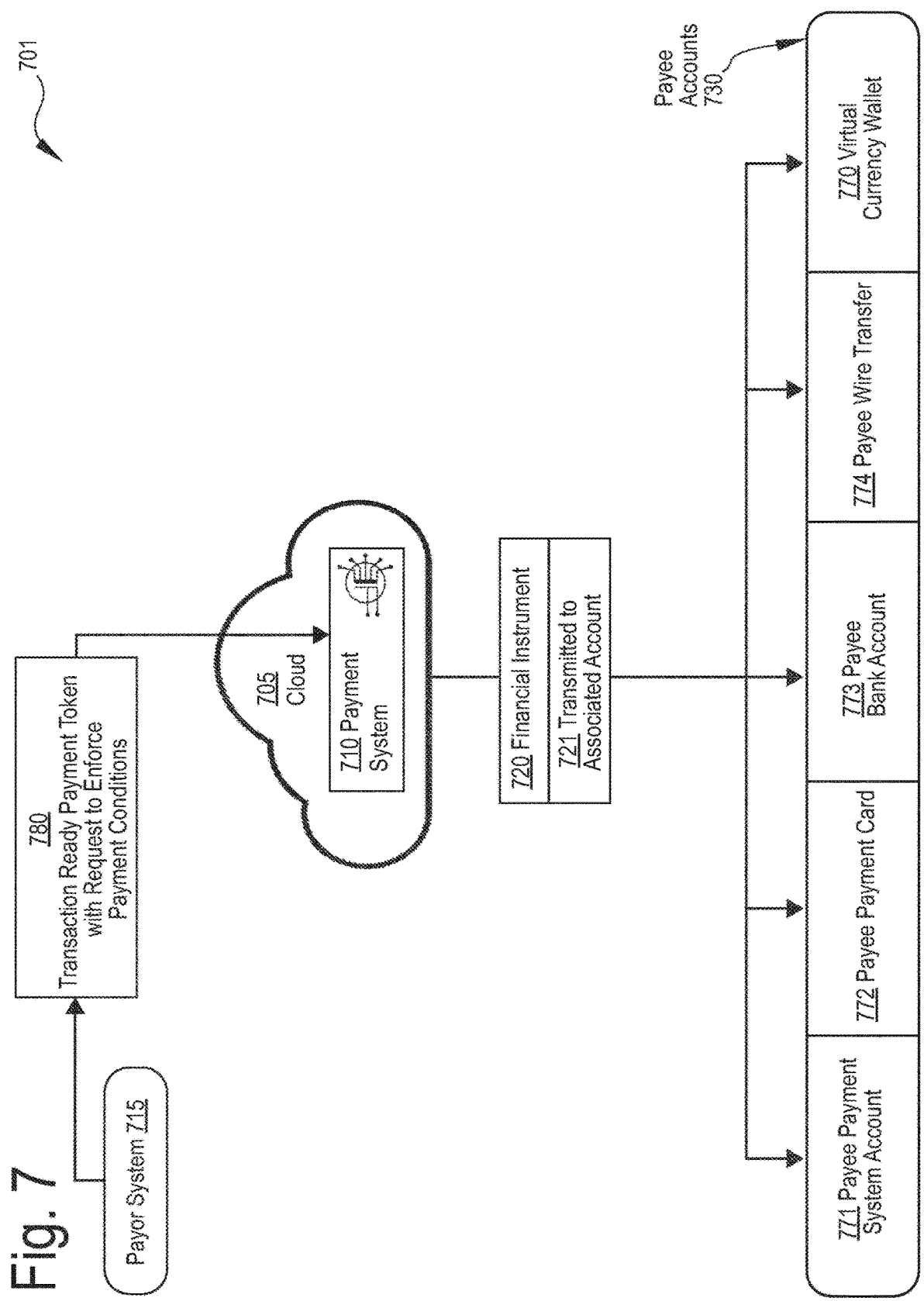
FIG. 7 depicts another exemplary architecture in accordance with disclosed embodiments.

FIG. 7 depicts another exemplary architecture 701 in accordance with disclosed embodiments. Generally, in operation, architecture 701 serves to generate and/or manage secure tokens in connection with transactions. For example, in some embodiments, architecture 701 includes a payor system 715 having received a transaction ready payment token, as described previously. The payor system 715 may then send the transaction ready payment token with a request to enforce the payment conditions 780 to the payment system 710 operating within the cloud 705. Having received the transaction ready payment token with the request to enforce its conditions, the payment system 710 will then effectuate payment from the payor to the payee as depicted. For instance, the payment system settles the payment conditions by transmitting the chosen financial instrument 720 (e.g., such as dollars, e-currency, or other instruments of monetary value) into corresponding payee account(s) 730, thus causing the funds to be transmitted into the associated account 721. Such payee accounts may be, for example, a virtual currency wallet 770, a payee payment system account 771, a payee payment card 772, a payee bank account 773, a payee wire transfer 774, or any other funds destination as specified by the account association information embedded within the transaction ready payment token.

Figure 8:
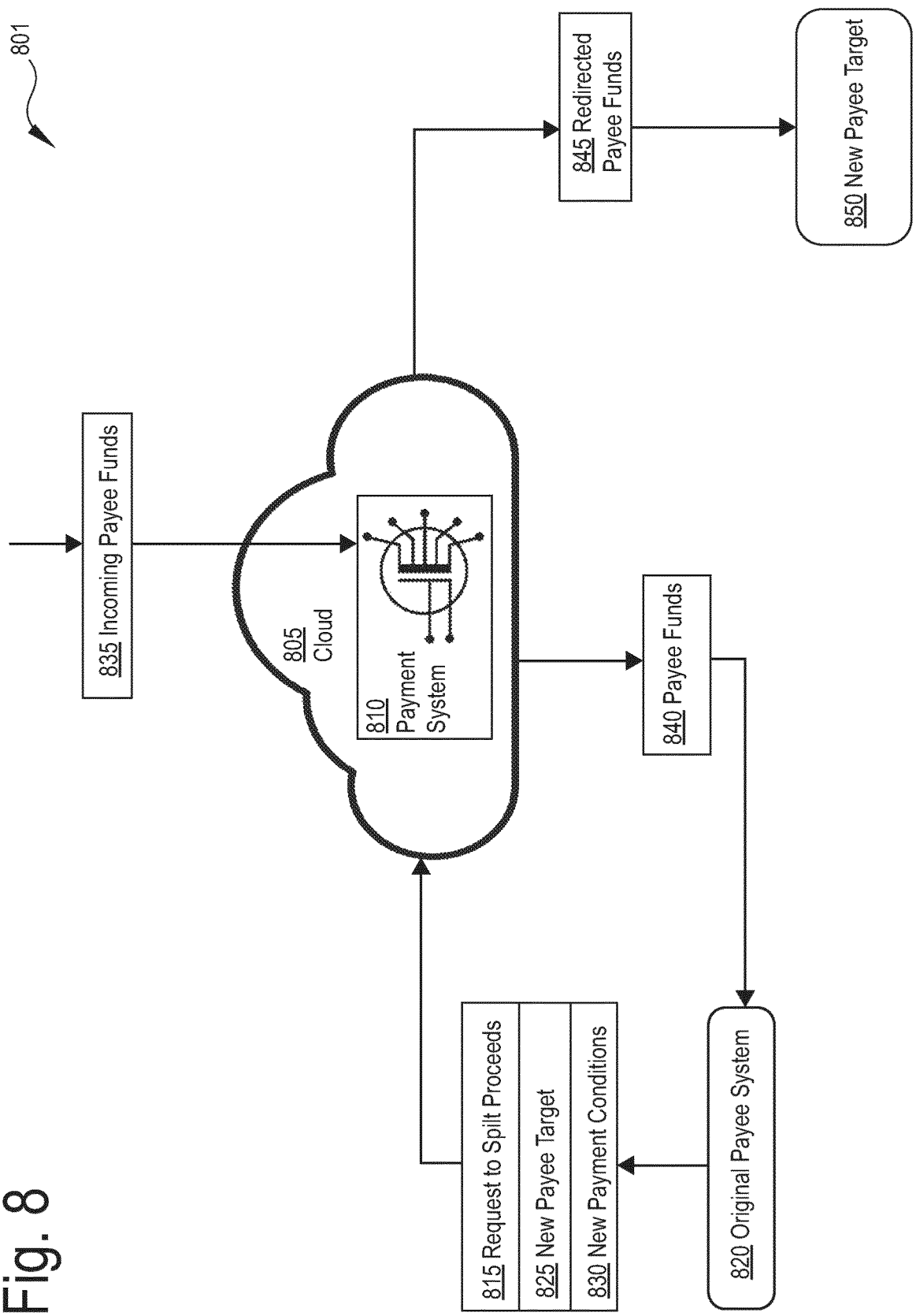
FIG. 8 depicts another exemplary architecture in accordance with disclosed embodiments.

FIG. 8 depicts another exemplary architecture 801 in accordance with disclosed embodiments. Generally, in operation, architecture 801 serves to generate and/or manage secure tokens in connection with transactions. For example, in some embodiments, architecture 801 includes payment system 810 operating within the cloud 805 and receiving the incoming funds pursuant to a transaction ready payment token as described previously.

As discussed above, the transaction ready payment token may be utilized to effectuate payment from the payor to the payee, however, the payment token may be passed to a third party with additional payment conditions as established by the target payee, thus causing the incoming payee funds 835 to be effectively redirected from the original payee to a new payee or at least partially re-directed from the original payee to a new payee.

For instance, as can be seen, the incoming payee funds 835 are received at the payment system $10 and are destined originally as payee funds 840 to the original payee system 820 (e.g., the payee as specified by the original payor). However, according to this embodiment, the original payee system 820 makes a request to split the proceeds 815, specifying a new payee target 825 and new payment conditions 830. The request to split the proceeds is transmitted by the original payee system to the payment system 810 causing the redirected payee funds 845 to be transmitted to a new payee target 850.

In practice, the request to split the proceeds 815 submitted by the original payee system 820 operates in the same manner as the request to initiate a payment or a request to generate a payment token as described previously with respect to the original payor system. However, with the redirection of funds, the funds are not originating from the original payee's account or funding source, but rather, originate from the original payor and are destined for the original payee but then redirected by the original payee according to the new payment conditions 830 specified by the original payee.

In accordance with a particular embodiment the merchant selling products via an e-commerce website never handles payment card or banking information to process transactions for the sale of merchandise and the merchant pays the target payee without handling the banking information associated with the target payee. Rather, the merchant as the payor utilizes a payment token or a "smart token" requested via the payment system to redirect funds from the merchant as the payor to the payee as directed by the payment conditions set by the merchant. Because the merchant utilizes the payment token as discussed herein, the payment token may subsequently be passed to yet another third party by the target payee and causing funds to be redirected from the original payor to the third party according to the payment conditions set by the payee. According to such an embodiment, all or a portion of the funds may be redirected from the original payor to the new payee target or third party without the original payor requiring any knowledge of the third party or knowledge that the funds are redirected.

According to the described embodiments, funds to be transferred from a payor to a payee pursuant to a transaction ready payment token are made portable such that the funds may be re-directed to a third party or a new payee which is not associated with the original payor to payee transaction. Unlike conventional solutions, the payment system additionally enables further payment conditions to be applied such as the amount, fractions, percentages, timing, and so forth, resulting in "smart negotiable financial instruments.

Meanwhile, the benefits of privacy, safety, and security are maintained as the parties are not exposed to the private and sensitive financial details such as the banking details and so forth. With conventional solutions, if a payor is to wire funds to a payee, the payee must provide banking details to the payor or the payor's agent which exposes the payee to some element of risk. However, with the payment system acting as a secure intermediary, the financial details of all parties are protected and kept secret and secure.

Figure 9:
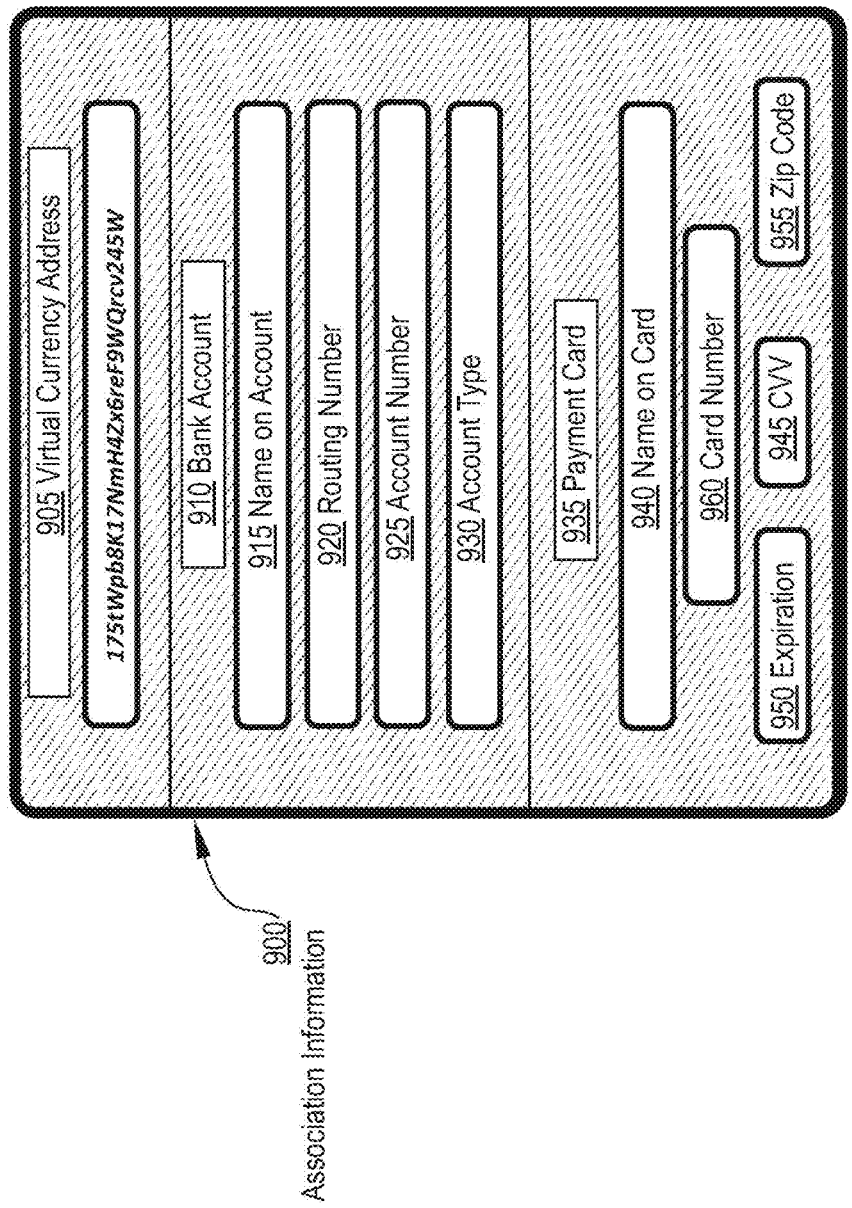
FIG. 9 depicts exemplary association information types which may be utilized as destinations or alternatively sources in accordance with disclosed embodiments.

FIG. 9 depicts exemplary association information 900 types which may be utilized as destinations or alternatively sources in accordance with disclosed embodiments. Exemplary destinations may be funding destinations and/or sources may be funding sources, in some embodiments. In particular, there are depicted a virtual currency address 905 having an alphanumeric string representing the funding destination to which payee funds are to be deposited or alternatively from where payor funds are to be withdrawn. Additionally depicted are bank account 910 details including, for instance, the name on account 915, the routing number 920, the account number 925, and the account type 930. Similarly, there is depicted payment card 935 payment details including, for instance, name on the card 940, card number 960, expiration 950, CVV Number ("Card Verification Value") 945, and billing zip code 955. Many other alternative funding destinations and funding sources may be utilized by the payment system including, for instance, any of those depicted at FIG. 7 which are labeled "payee accounts 730,"

Figure 10A:
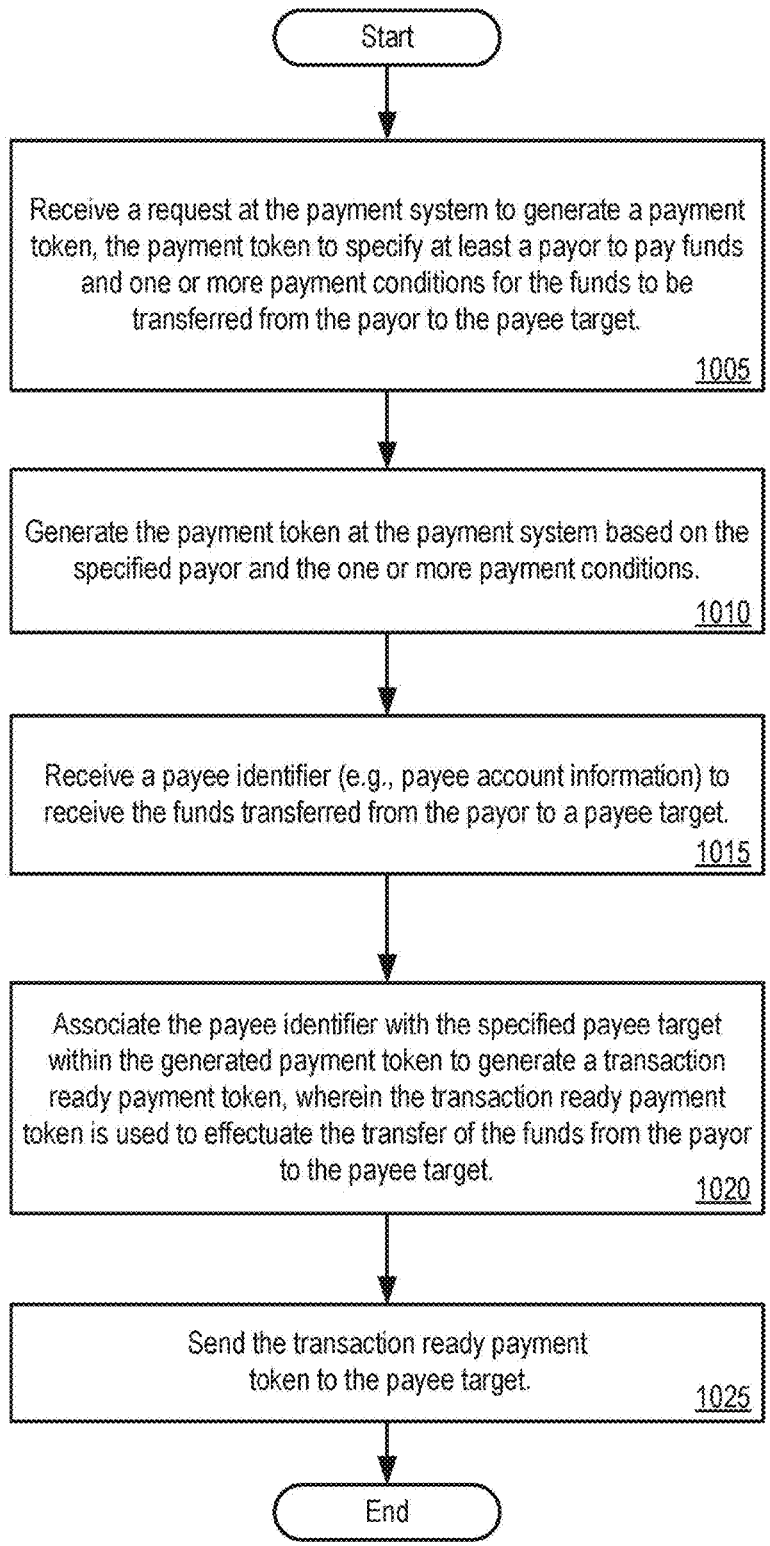
FIG. 10A depicts a flow diagram illustrating method for implementing splitting for a token in accordance with disclosed embodiments.

FIG. 10A depicts a flow diagram illustrating method 1000 for implementing splitting for a token in accordance with disclosed embodiments. In some embodiments, implementing splitting in this manner includes proceeds splitting. In some embodiments, tokens for which splitting is implemented are payment tokens. FIG. 10B depicts another flow diagram illustrating an alternative method 1001 for implementing splitting for a token and effectuating payout in accordance with disclosed embodiments.

Methods 1000 and 1001 may be performed by processing logic that may include hardware (e.g., circuitry, dedicated logic, programmable logic, microcode, etc.), software (e.g., instructions run on a processing device) to perform various operations such as receiving, generating, associating, sending, splitting, inviting, transmitting, updating, presenting, interfacing, communicating, querying, processing, etc., in pursuance of the systems and methods as described herein. For example, the payment system 110 as depicted at FIG. 1 or the system 1100 at FIG. 11 or the machine 1200 at FIG. 12, may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference method 1000 depicted at FIG. 10A, at block 1005, processing logic receives a request at a payment system to generate a payment token, in which the payment token specifies at least a payor to pay funds and one or more payment conditions for the funds to be transferred from the payor to a payee target.

At block 1010, processing logic generates the payment token at the payment system based on the specified payor and the one or more payment conditions.

At block 1015, processing logic receives a payee identifier (e.g., payee account information) to receive the funds transferred from the payor to a payee target.

At block 1020, processing logic associates the payee identifier (e.g., payee account information) with the specified payee target within the generated payment token to generate a transaction ready payment token, wherein the transaction ready payment token is used to effectuate the transfer of the funds from the payor to the payee target. For example, the transaction ready payment token captures a minimum amount of information needed to transact with the payment token. Some of the information, such as the payor's account association may be provided by the payor requesting the payment token, whereas other information, such as the payee's account association information may be provided by the payee and updated within the payment token. In other embodiments, the payor may have the payee's account association information and in yet other embodiments, the payor may specify a payment and payment conditions but submit the payment token request without specifying a payee target, which must therefore be updated to the payment token later.

At block 1025, method 1000 concludes with processing logic that sends the transaction ready payment token to the payee target.

With reference now to method 1001 as depicted at FIG. 10B, the operations from FIG. 10A are identical from blocks 1005 through 1025. However, optional processing is now presented at block 1030, where processing logic performs a payout of funds by enforcing payment conditions pursuant to transaction ready payment token and transmitting funds to associated payee account.

According to another embodiment, either of the methods 1000 and 1001 may further include receiving input at the payment system specifying the payee target to receive the funds, in which the payee target is not specified with the request received at the payment system to generate the payment token, and updating the payment token at the payment system to include the specified payee target to receive the funds, in which the payment system generates the transaction ready payment token based on the updated payment token having the specified payee target included therein. For instance, it is permissible to request the payment token without initially specifying the payee target which may be updated to the payment token in a subsequent operation.

According to another embodiment, methods 1000 and 1001 may further include receiving a request from the payee target to split the transfer of the funds from the payor between the payee target and one or more new payee targets specified by the payee target; and in which the transfer of funds is effectuated by the payment system from the payor to each of the payee target and the one or more new payee targets based on one or more new payment conditions as specified by the payee target.

According to another embodiment of method 1000 or 1001, receiving the request from the payee target to split the transfer of the funds includes: receiving a new request at the payment system to generate a new payment token, the new payment token to specify at least (i) the payee target as a new payor to pay the funds, (ii) a new payee target to receive the funds different than the payee target requesting the new payment token, and (iii) one or more new payment conditions for a portion of the funds to be split in the transfer of the funds from the payor to the payee target and one or more new payee targets specified by the payee target; generating the new payment token at the payment system based on the specified new payor, the new payee target, and the one or more new payment conditions; receiving a new payee identifier (e.g., new payee account information) to receive the portion of the funds split in the transfer of the funds from the payor to the payee target, associating the new payee identifier with the specified new payee target within the new generated payment token to generate a new transaction ready payment token, in which the new payment token is used to effectuate the transfer of the portion of the funds to the new payee target from the funds transferred from the payor to the payee target, and sending the new transaction ready payment token to the new payee target.

According to another embodiment of method 1000 or 1001, receiving a request at the payment system to generate a payment token includes one of receiving a request from a payor system associated with the payor to generate the payment token to effectuate payment from the payor to a payee associated with the payee target; and receiving a request from a payee system associated with the payee target to generate the payment token to effectuate payment from the payor to a payee associated with the payee target.

According to another embodiment of method 1000 or 1001, the payee target is whitelisted by the payor and authorized to request payment from the payor by submitting the request to the payment system to generate the payment token; and in which the payment token generated at the payment system is accepted by the payor prior to the transaction ready payment token being sent to the payee target to effectuate the transfer of the funds from the payor to the payee target.

According to another embodiment of method 1000 or 1001, receiving a request at the payment system to generate a payment token includes receiving the request via an Application Programming Interface (API) call from a payor system associated with the payor.

According to another embodiment of method 1000 or 1001, the API call from the payor system to the payment system includes a request by the payor system for the payment system to generate the payment token based on the specified payor, payee target, and the one or more payment conditions to effectuate the transfer of the funds from the payor to the payee target.

According to another embodiment of method 1000 or 1001, the specified payor to pay funds, the payee target to receive the funds, and the one or more payment conditions for the funds to be transferred are passed with the request via the API call from the payor system to the payment system.

According to another embodiment of method 1000 or 1001, the API call is generated by a Graphical User Interface (GUI) executed by the payor system, in which the GUI receives as input the specified payor to pay funds, the payee target to receive the funds, and the one or more payment conditions for the funds to be transferred and passes the input to the payment system via the API call.

According to another embodiment of method 1000 or 1001, receiving a request at the payment system to generate a payment token includes receiving the request via a Graphical User Interface (GUI) hosted by the payment system and accessed remotely from a payor system associated with the payor, in which the specified payor to pay funds, the payee target to receive the funds, and the one or more payment conditions for the funds to be transferred are input at the GUI displayed to the payor system and received as parameters at the payment system for generating the payment token.

According to another embodiment of method 1000 or 1001, the payee target is associated with a user account maintained by the payment system; and in which the payee target receives the transaction ready payment token within the user account maintained by the payment system and effectuates the transfer of the funds from the payee into the user account as specified by the associated payee identifier by accepting the transaction ready payment token via a user interface of the payment system.

According to another embodiment of method 1000 or 1001, the generated payment token is decipherable at the payment system and indecipherable to the specified payor and a payee associated with the specified payee target.

According to another embodiment of method 1000 or 1001, the payee target includes an Alternative Payment Method (APM) transaction target specified by the payor. Alternative Payment Methods (or APMs) are a general umbrella term for financial instruments such as ApplePay, PayPal, virtual currencies, etc., generally supporting non-card transactions. The payee target may include a virtual currency address provided by the payor. For instance, bitcoin is one type of the more general "virtual currency," but there are many others available. Moreover, the payee target may include information which is public (e.g., phone number, email address, etc.) or may include information which is private (e.g., bank account and routing number). The payee target may alternatively specify an email address provided by the specifying a payee to receive the transfer of funds; a phone number provided by the payor specifying the payee; an SMS text number provided by the payor specifying the payee; a payment system user ID provided by the payor specifying the payee; a bank account and routing number provided by the payor specifying the payee, a public key of the payee provided by the payor to specify the payee to receive the transfer of funds; or payment card account information provided by the payor specifying the payee.

According to another embodiment, method 1000 or 1001 further includes receiving an input at the payment system specifying the payee target, requesting an associated payee identifier from the payee target based on the payee target; receiving the associated payee identifier from the payee target, the associated payee identifier associating the payee target with a payee account of the payee to receive the transfer of the funds from the payor, and in which associating the payee identifier with the specified payee target within the generated payment token to generate the transaction ready payment token includes updating the generated payment token with the associated payee identifier received from the payee target to generate the transaction ready payment token.

According to another embodiment of method 1000 or 1001, the payee target is a merchant having a merchant user account maintained by the payment system, and in which sending the transaction ready payment token to the payee target includes delivering the transaction ready payment token to the merchant user account within the payment system and associating the transaction ready payment token with the merchant user account within the payment system to effectuate payment from the payor to the merchant user account, According to another embodiment of method 1000 or 1001, the payor includes one of a second merchant account maintained by the payment system, distinct from the first merchant user account; a purchaser having a user account maintained by the payment system; a purchaser unaffiliated with the payment system and lacking any user account or merchant account with the payment system.

According to another embodiment of method 1000 or 1001, the one or more payment conditions include at least one of: an amount of funds to be transferred from the payor to the payee target; a percentage of revenue of the payor to be transferred from the payor to the payee target until a specified total amount of funds to transfer is attained; a percentage of revenue to be transferred from the payor to the payee target over a specified time period until either the specified time period is reached or alternatively until a specified total amount of funds to transfer is attained; and a specified amount of funds to be iteratively transferred from the payor to the payee target until a specified total amount of funds to be transferred is attained.

According to another embodiment of method 1000 or 1001, the payment system includes a cloud based payment system communicably interfaced to a payor system having at least a processor and a memory therein via a public Internet and further communicably interfaced to a payee system having at least a processor and a memory therein via the public Internet.

In accordance with a particular embodiment, there is non-transitory computer readable storage media having instructions stored thereupon that, when executed by a processor of a payment system having at least the processor and a memory therein, the instructions cause the payment system to perform operations including: receiving a request at the payment system to generate a payment token, the payment token to specify at least a payor to pay funds and one or more payment conditions for the funds to be transferred from the payor to a payee target, generating the payment token at the payment system based on the specified payor and the one or more payment conditions; receiving a payee identifier (e.g., payee account information) to receive the funds transferred from the payor to a payee target, associating the payee identifier with the specified payee target within the generated payment token to generate a transaction ready payment token, in which the transaction ready payment token is used to effectuate the transfer of the funds from the payor to the payee target, and sending the transaction ready payment token to the payee target.

According to another embodiment, the instruction cause the payment system to further perform operations including receiving a request from the payee target to split the transfer of the funds from the payor between the payee target and one or more new payee targets specified by the payee target, and in which the transfer of funds is effectuated by the payment system from the payor to each of the payee target and the one or more new payee targets based on one or more new payment conditions as specified by the payee target.

Figure 11:
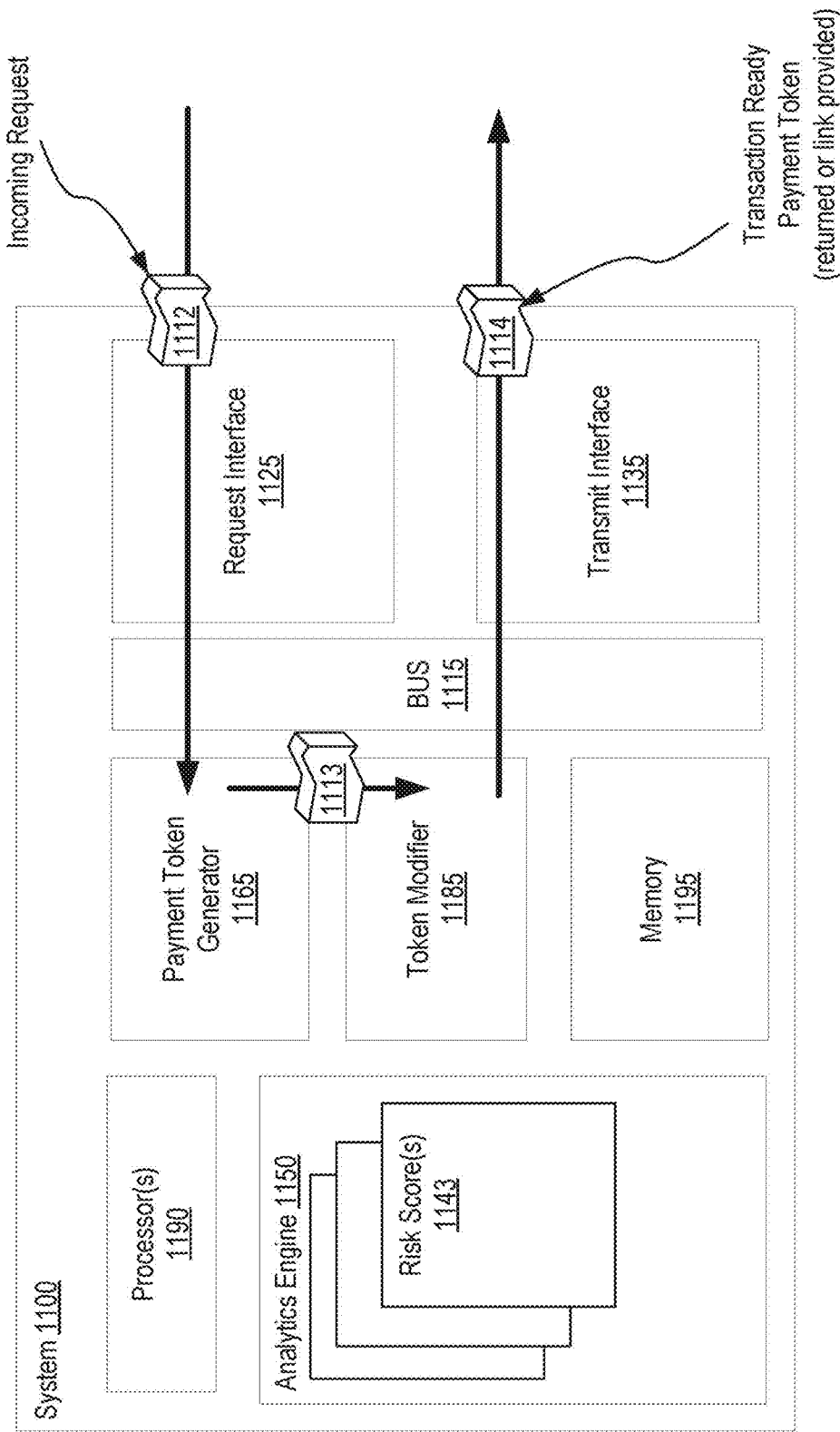
FIG. 11 shows a diagrammatic representation of a system within which embodiments may operate, be installed, integrated, or configured.

FIG. 11 shows a diagrammatic representation of a system 1100 within which embodiments may operate, be installed, integrated, or configured. In accordance with one embodiment, there is a system 1100 having at least a processor 1190 and a memory 1195 therein to execute application code 1185. Such a system 1100 may communicatively interface with and cooperatively execute with the benefit of a hosted computing environment, such as a cloud computing environment as depicted at FIG. 1, as an on-demand service provider, a cloud-based service provider, within a client-server environment, etc.

According to the depicted embodiment, the system 1100 includes the 1190 and the memory 1195 to execute instructions at the system 1100; an analytics engine 1150 provides analytics to generate risk score(s) 1143 for transactions handled by the system. A request interface 1125 is enabled to receive incoming requests, for instance, from payee systems, payor systems, etc. The request may be via web interfaces, API calls, etc. A payment token generator 1165 generates payment token 1113 responsive to the incoming request 1112 and token modifier 1185 performs payment token updating or payment token modification based upon subsequently received information, such as account association information received from a payee target. A transmit interface 1135 is enabled to return transaction ready payment tokens 1114 to the payor or payee or both a payor and a payee either as an electronic payment token (e.g., an object or a file) or as a link according to the particular implementation.

Bus 1115 interfaces the various components of the system 1100 amongst each other, with any other peripheral(s) of the system 1100, and with external components such as external network elements, other machines, client devices, cloud computing services, etc. Communications may further include communicating with external devices via a network interface over a LAN, WAN, or the public Internet.

It is therefore in accordance with a particular embodiment that there is a payment system 1100, having therein; a memory 1195 to store instructions; a processor 1190 to execute the stored instructions, a receive interface 1125 to receive a request 1112 at the payment system to generate a payment token 1113, the payment token to specify at least a payor to pay funds and one or more payment conditions for the funds to be transferred from the payor to a payee target, a token generator 1165 to generate the payment token 1113 at the payment system 1100 based on the specified payor and the one or more payment conditions; in which the receive interface 1125 is to further receive the payee identifier to receive the funds transferred from the payor to a payee target. According to such an embodiment, the payment token generator 1165 or a token modifier 1185 is to further associate the payee identifier with the specified payee target within the generated payment token to generate a transaction ready payment token 1114, in which the transaction ready payment token is used to effectuate the transfer of the funds from the payor to the payee target. There is further a transmit interface 1135 to send the transaction ready payment token 1114 to the payee target.

According to another embodiment of the payment system 1100, the receive interface is to further receive a proceeds split request from the payee target, the proceeds split request specifying instructions to split the transfer of the funds from the payor between the payee target and one or more new payee targets specified by the payee target; and in which the transfer of funds is effectuated by the payment system from the payor to each of the payee target and the one or more new payee targets based on one or more new payment conditions as specified by the payee target.

FIG. 12 illustrates a diagrammatic representation of a machine 1200 in the exemplary form of a computer system, in accordance with one embodiment, within which a set of instructions, for causing the machine/computer system 1200 to perform any one or more of the methodologies discussed herein. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1200 includes a processor 1202, a main memory 1204 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1218 (e.g., a persistent storage device including hard disk drives and a persistent database system implementation), which communicate with each other via a bus 1230. Main memory 1204 includes a payment token generator 1224 to generate payment tokens and an analytics engine 1223 to analyze transactions for risk and generate fraud or risk scores. Main memory 1204 further includes the generated payment tokens 1225 which may be stored as objects or files or which may be stored as information within servers or databases to which links or pointers are provided as necessary in accordance with the embodiments described herein. Main memory 1204 and its sub-elements are operable in conjunction with processing logic 1226 and processor 1202 to perform the methodologies discussed herein.

Processor 1202 represents one or more general-purpose processing devices such as a microprocessor, central processing unit, or the like. More particularly, the processor 1202 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1202 may also be one or more special-purpose processing devices such as an application specific integrated circuit (ASIC), a field programmable gate array (FPGA), a digital signal processor (DSP), network processor, or the like. Processor 1202 is configured to execute the processing logic 1226 for performing the operations and functionality which is discussed herein.

The computer system 1200 may further include a network interface card 1208. The computer system 1200 also may include a user interface 1210 (such as a video display unit, a liquid crystal display, etc.), an alphanumeric input device 1212 (e.g., a keyboard), a cursor control device 1214 (e.g., a mouse), and a signal generation device 1216 (e.g., an integrated speaker). The computer system 1200 may further include peripheral device 1236 (e.g., wireless or wired communication devices, memory devices, storage devices, audio processing devices, video processing devices, etc.).

The secondary memory 1218 may include a non-transitory machine-readable. storage medium or a non-transitory computer readable storage medium or a non-transitory machine-accessible storage medium 1231 on which is stored one or more sets of instructions (e.g., software 1222) embodying any one or more of the methodologies or functions described herein. The software 1222 may also reside, completely or at least partially, within the main memory 1204 and/or within the processor 1202 during execution thereof by the computer system 1200, the main memory 1204 and the processor 1202 also constituting machine-readable storage media. The software 1222 may further be transmitted or received over a network 1220 via the network interface card 1208.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A computer-implemented method performed by a server computer system for processing a routing of data between a first remote computing system and a second remote computing system, comprising:
   receiving, by an interface of the server computer system from the first remote computing system, a request to initiate the routing of data between the first remote computing system and the second remote computing system, the request comprising an incomplete set of parameters;
   receiving, by the interface of the server computer system, a validation challenge and a challenge response defined by the first remote computing system;
   generating, by a processing system of the server computer system, a token for the routing of data, the token referencing at least the first remote computing system and the incomplete set of parameters, and the token decipherable at the server computer system and indecipherable to the first remote computing system and the second remote computing system;
   performing, by the server computer system, a validation of the second remote computing system based on the validation challenge and the challenge response defined by the first remote computing system;
   in response to a successful validation of the second remote computing system, receiving, by the interface of the server computer system, a second set of parameters from the second remote computing system, wherein the incomplete set of parameters and the second set of parameters form a complete set of parameters referenced by the token; and
   processing, by the server computer system, the routing of data between the first remote computing system and the second remote computing system using the complete set of parameters referenced by the token.

2. The method of claim 1, wherein the interface comprises an application programming interface (API) request interface, and wherein the request to initiate the routing of data between the first remote computing system and the second remote computing system, the validation challenge and the challenge response, and the second set of parameters are received as API messages transmitted to the API request interface over a communications network.

3. The method of claim 1, further comprising:
   generating a randomly generated identifier that references the complete set of parameters;
   transmitting, by the server computer system to the first remote computing system, the randomly generated identifier that references the complete set of parameters;
   performing the processing, by the server computer system, of the routing of data between the first remote computing system and the second remote computing system in response to receiving the randomly generated identifier with the request to perform the processing of the routing of data.

4. The method of claim 3, further comprising:
   accessing the complete set of parameters referenced by the randomly generated identifier in response to the receipt of the randomly generated identifier;
   verifying one or more of the complete set of parameters are satisfied by one or more corresponding current parameters associated with the routing of data being processed between the first remote computing system and the second remote computing system; and
   completing the processing of the routing of data between the first remote computing system and the second remote computing system in response to the verification of the one or more of the complete set of parameters are satisfied by the one or more corresponding current parameters.

5. The method of claim 3, wherein the randomly generated identifier comprises a pointer or link to a data storage location of a data store where the complete set of parameters are stored by the server computer system, and the pointer and link are the token.

6. The method of claim 3, wherein the randomly generated identifier is stored in an object or file, and the object or file comprises the token.

7. The method of claim 1, wherein performing the validation of the second remote computing system, comprises:
   generating, in a Graphical User Interface (GUI) rendered on a display of the second remote computing system, the validation challenge comprised in the token;
   receiving a challenge response from the second remote computing system generated by the GUI; and
   validating an identity of the second remote computing system when the challenge response received from the second remote computing system matches the validation response defined by the first remote computing system.

8. The method of claim 1, wherein the request to initiate the routing of data comprises a request to generate the token, further comprising:
   analyzing, by an analytics engine of the server computer system, one or more fraud detection parameters associated with the request to generate the token;
   detecting, by the analytics engine, whether the determined risk of fraud satisfies a fraud detection threshold;
   rejecting the request to generate the token when the determined risk of fraud fails to satisfy the fraud detection threshold; and
   accepting the request to generate the token when the determined risk of fraud satisfied the fraud detection threshold.

9. The method of claim 8, wherein the one or more fraud detection parameters associated with the request to generate the token comprise: one or more of a total number of tokens requested by the first remote computing system over a period of time, a total number of routings of data processed by the server computer system for the first remote computing system, whether one of the incomplete set of parameters deviates from an expected value of a parameter.

10. A non-transitory machine-readable medium, having instructions stored thereon, which when executed by a processing system of a server computer system, cause the server computer system to perform operations for processing a routing of data between a first remote computing system and a second remote computing system, the operations comprising:
   receiving, by an interface of the server computer system from the first remote computing system, a request to initiate the routing of data between the first remote computing system and the second remote computing system, the request comprising an incomplete set of parameters;

receiving, by the interface of the server computer system, a validation challenge and a challenge response defined by the first remote computing system;

generating a token for the routing of data, the token referencing at least the first remote computing system and the incomplete set of parameters, and the token decipherable at the server computer system and indecipherable to the first remote computing system and the second remote computing system;

performing a validation of the second remote computing system based on the validation challenge and the challenge response defined by the first remote computing system;

in response to a successful validation of the second remote computing system, receiving, by the interface of the server computer system, a second set of parameters from the second remote computing system, wherein the incomplete set of parameters and the second set of parameters form a complete set of parameters referenced by the token; and processing the routing of data between the first remote computing system and the second remote computing system using the complete set of parameters referenced by the token.

11. The non-transitory machine-readable medium of claim 10, wherein the interface comprises an application programming interface (API) request interface, and wherein the request to initiate the routing of data between the first remote computing system and the second remote computing system, the validation challenge and the challenge response, and the second set of parameters are received as API messages transmitted to the API request interface over a communications network.

12. The non-transitory machine-readable medium of claim 10, further comprising:

generating a randomly generated identifier that references the complete set of parameters;

transmitting, by the server computer system to the first remote computing system, the randomly generated identifier that references the complete set of parameters;

performing the processing, by the server computer system, of the routing of data between the first remote computing system and the second remote computing system in response to receiving the randomly generated identifier with the request to perform the processing of the routing of data.

13. The non-transitory machine-readable medium of claim 12, further comprising:

accessing the complete set of parameters referenced by the randomly generated identifier in response to the receipt of the randomly generated identifier;

verifying one or more of the complete set of parameters are satisfied by one or more corresponding current parameters associated with the routing of data being processed between the first remote computing system and the second remote computing system; and completing the processing of the routing of data between the first remote computing system and the second remote computing system in response to the verification of the one or more of the complete set of parameters are satisfied by the one or more corresponding current parameters.

14. The non-transitory machine-readable medium of claim 10, wherein the request to initiate the routing of data comprises a request to generate the token, further comprising:

analyzing, by an analytics engine of the server computer system, one or more fraud detection parameters associated with the request to generate the token;

detecting, by the analytics engine, whether the determined risk of fraud satisfies a fraud detection threshold;

rejecting the request to generate the token when the determined risk of fraud fails to satisfy the fraud detection threshold; and accepting the request to generate the token when the determined risk of fraud satisfies the fraud detection threshold.

15. A server computer system for processing a routing of data between a first remote computing system and a second remote computing system, comprising:

a memory storing instructions; and a processing system, coupled with the memory, and configured to execute the instructions causing the server computer system to perform operations, comprising:

receiving, by an interface of the server computer system from the first remote computing system, a request to initiate the routing of data between the first remote computing system and the second remote computing system, the request comprising an incomplete set of parameters;

receiving, by the interface of the server computer system, a validation challenge and a challenge response defined by the first remote computing system;

generating a token for the routing of data, the token referencing at least the first remote computing system and the incomplete set of parameters, and the token decipherable at the server computer system and indecipherable to the first remote computing system and the second remote computing system;

performing a validation of the second remote computing system based on the validation challenge and the challenge response defined by the first remote computing system;

in response to a successful validation of the second remote computing system, receiving, by the interface of the server computer system, a second set of parameters from the second remote computing system, wherein the incomplete set of parameters and the second set of parameters form a complete set of parameters referenced by the token; and processing the routing of data between the first remote computing system and the second remote computing system using the complete set of parameters referenced by the token.

16. The server computer system of claim 15, wherein the interface comprises an application programming interface (API) request interface, and wherein the request to initiate the routing of data between the first remote computing system and the second remote computing system, the validation challenge and the challenge response, and the second set of parameters are received as API messages transmitted to the API request interface over a communications network.

17. The server computer system of claim 15, wherein the processing system is further configured to perform operations, comprising:

generating a randomly generated identifier that references the complete set of parameters;

transmitting, by the server computer system to the first remote computing system, the randomly generated identifier that references the complete set of parameters;

performing the processing, by the server computer system, of the routing of data between the first remote computing system and the second remote computing system in response to receiving the randomly generated identifier with the request to perform the processing of the routing of data.

18. The server computer system of claim 17, wherein the processing system is further configured to perform operations, comprising:

accessing the complete set of parameters referenced by the randomly generated identifier in response to the receipt of the randomly generated identifier;

verifying one or more of the complete set of parameters are satisfied by one or more corresponding current parameters associated with the routing of data being processed between the first remote computing system and the second remote computing system; and completing the processing of the routing of data between the first remote computing system and the second remote computing system in response to the verification of the one or more of the complete set of parameters are satisfied by the one or more corresponding current parameters.

19. The server computer system of claim 15, wherein the request to initiate the routing of data comprises a request to generate the token, and the processing system is further configured to perform operations, comprising:

analyzing, by an analytics engine of the server computer system, one or more fraud detection parameters associated with the request to generate the token;

detecting, by the analytics engine, whether the determined risk of fraud satisfies a fraud detection threshold;

rejecting the request to generate the token when the determined risk of fraud fails to satisfy the fraud detection threshold; and accepting the request to generate the token when the determined risk of fraud satisfies the fraud detection threshold.

\* \* \* \* \*